US012684596B2

(12) United States Patent
Park et al.

(10) Patent No.: US 12,684,596 B2
(45) Date of Patent: Jul. 14, 2026

(54) CONFIGURATION METHOD AND APPARATUS FOR COMMON SL DRX CONFIGURATION IN NR V2X

(71) Applicant: LG Electronics Inc., Seoul (KR)

(72) Inventors: Giwon Park, Seoul (KR); Seoyoung Back, Seoul (KR); Hanbyul Seo, Seoul (KR); Seungmin Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 365 days.

(21) Appl. No.: 18/579,789

(22) PCT Filed: Jul. 18, 2022

(86) PCT No.: PCT/KR2022/010472
§ 371 (c)(1),
(2) Date: Jan. 16, 2024

(87) PCT Pub. No.: WO2023/287267
PCT Pub. Date: Jan. 19, 2023

(65) Prior Publication Data
US 2024/0357618 A1 Oct. 24, 2024

Related U.S. Application Data

(60) Provisional application No. 63/229,560, filed on Aug. 5, 2021.

(30) Foreign Application Priority Data

Jul. 16, 2021 (KR) ........................ 10-2021-0093652
Nov. 11, 2021 (KR) ........................ 10-2021-0154458

(51) Int. Cl.
*H04W 72/25* (2023.01)
*H04W 28/02* (2009.01)
(Continued)

(52) U.S. Cl.
CPC ....... *H04W 72/25* (2023.01); *H04W 28/0268* (2013.01); *H04W 76/14* (2018.02); *H04W 76/28* (2018.02)

(58) Field of Classification Search
CPC . H04W 72/25; H04W 28/0268; H04W 76/14; H04W 76/28
See application file for complete search history.

(56) References Cited

U.S. PATENT DOCUMENTS

2019/0387446 A1 12/2019 Xu et al.
2021/0195522 A1 6/2021 Sridharan et al.
(Continued)

FOREIGN PATENT DOCUMENTS

CA 3146703 A1 * 2/2021 .......... H04W 72/566

OTHER PUBLICATIONS

Apple, "Discussion on remaining issues on SL DRX Configuration," 3GPP TSG-RAN WG2 Meeting #113e, R2-2100862, Online, Jan. 25-Feb. 5, 2020, 4 pages.
(Continued)

*Primary Examiner* — Derrick V Rose
(74) *Attorney, Agent, or Firm* — Fish & Richardson P.C.

(57) ABSTRACT

Proposed is a method for operation of a first device (100) in a wireless communication system. The method may comprise the steps of: acquiring information regarding an SL DRX configuration related to at least one QoS profile and information regarding a default SL DRX configuration; and on the basis of there being no SL DRX configuration being mapped to a QoS profile related to an MAC PDU, determining the default SL DRX configuration as an SL DRX configuration for SL communication.

15 Claims, 14 Drawing Sheets

(51) Int. Cl.
  *H04W 76/14*      (2018.01)
  *H04W 76/28*      (2018.01)

(56)              References Cited

U.S. PATENT DOCUMENTS

2023/0309016 A1* 9/2023 Li .......................... H04W 76/14
2023/0422344 A1* 12/2023 Cai ....................... H04L 1/1896

OTHER PUBLICATIONS

International Search Report and Written Opinion in Appln. No. PCT/KR2022/010472, mailed on Oct. 26, 2022, 6 pages (with English translation).

Nokia, Nokia Shanghai Bell, "Further Issues on Sidelink Traffic Pattern for SL DRX Configuration," 3GPP TSG-RAN WG2 Meeting #114 Electronic, R2-2105958, Elbonia, May 19-27, 2021, 3 pages.

Oppo, "Discussion on DRX configuration and DRX timers," 3GPP TSG-RAN WG2 #114-e, R2-2104835, E-meeting, May 2021, 17 pages.

ZTE Corporation, Sanechips, "Discussion on principle for Sidelink DRX," 3GPP TSG-RAN WG2 Meeting #113 electronic, R2-2100496, Online, Jan. 25-Feb. 5, 2021, 5 pages.

Fujitsu, "Alignment of Wake-up Time between TX and RX Ues," R2-2100422 (Update of R2-2009133), 3GPP TSG RAN WG2 Meeting #113-e, e-Meeting, Jan. 25-Feb. 5, 2021, 17 pages.

LG (rapporteur), "Summary of email discussion [702][SLe] High-level principles for SL DRX (LG)," R2-2101727, 3GPP TSG-RAN WG2 #113-e, E-meeting, Jan. 2021, 85 pages.

LG Electronics Inc., "Consideration on SL DRX operation," R2-2106204, 3GPP TSG-RAN WG2 Meeting #114-e, Electronics Meeting, May 19-27, 2021, 3 pages.

Office Action in Japanese Appln. No. 2024-502503, mailed on Mar. 11, 2025, 9 pages (with English translation).

3GPP TR 23.776 V17.0.0 (Mar. 2021), 3rd Generation Partnership Project; Technical Specification Group Services and System Aspects; Study on architecture enhancements for 3GPP support of advanced Vehicle-to-Everything (V2X) services; Phase 2 (Release 17), Mar. 2021, 29 pages.

3GPP TR 38.885 V16.0.0 (Mar. 2019), 3rd Generation Partnership Project; Technical Specification Group Radio Access Network; NR; Study on NR Vehicle-to-Everything (V2X) (Release 16), Mar. 2019, 122 pages.

3GPP TS 38.300 V16.6.0 (Jun. 2021), 3rd Generation Partnership Project; Technical Specification Group Radio Access Network; NR; NR and NG-RAN Overall Description; Stage 2 (Release 16), Jun. 2021, 152 pages.

Extended European Search Report in European Appln. No. 22842529.4, mailed on Sep. 27, 2024, 13 pages.

Lenovo, Motorola Mobility, "Discussion on SL DRX for unicast," R2-2103401, 3GPP TSG-RAN WG2, Meeting #113 bis, electronic, Online, Apr. 12-20, 2021, 7 pages.

LG Electronics Inc., "Further discussion on Sidelink/Uu DRX timer," R2-2107242, 3GPP TSG-RAN WG2, Meeting #115-e, Electronic Meeting, Aug. 16-27, 2021, 6 pages.

* cited by examiner

FIG. 2

F I G. 4
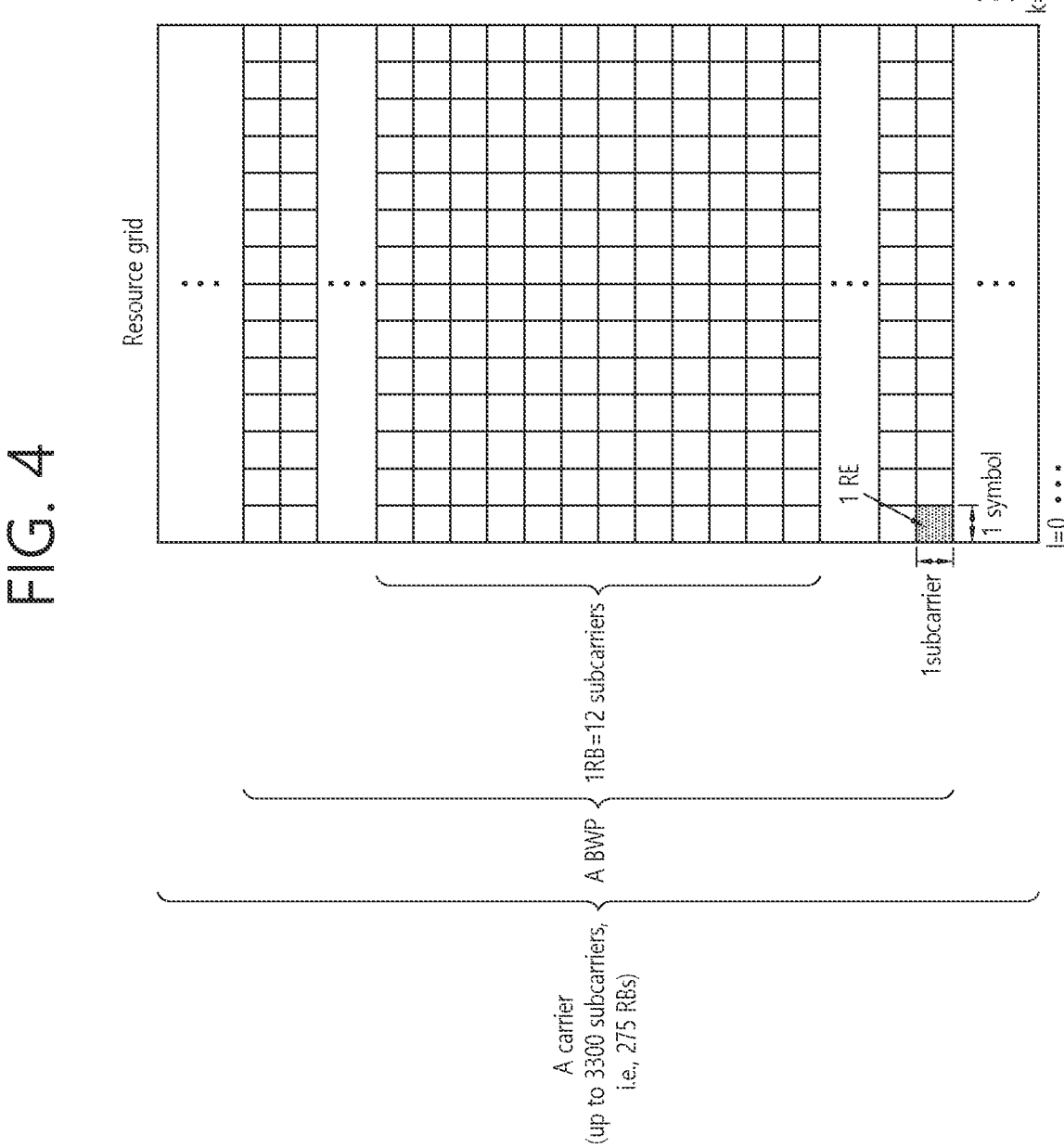

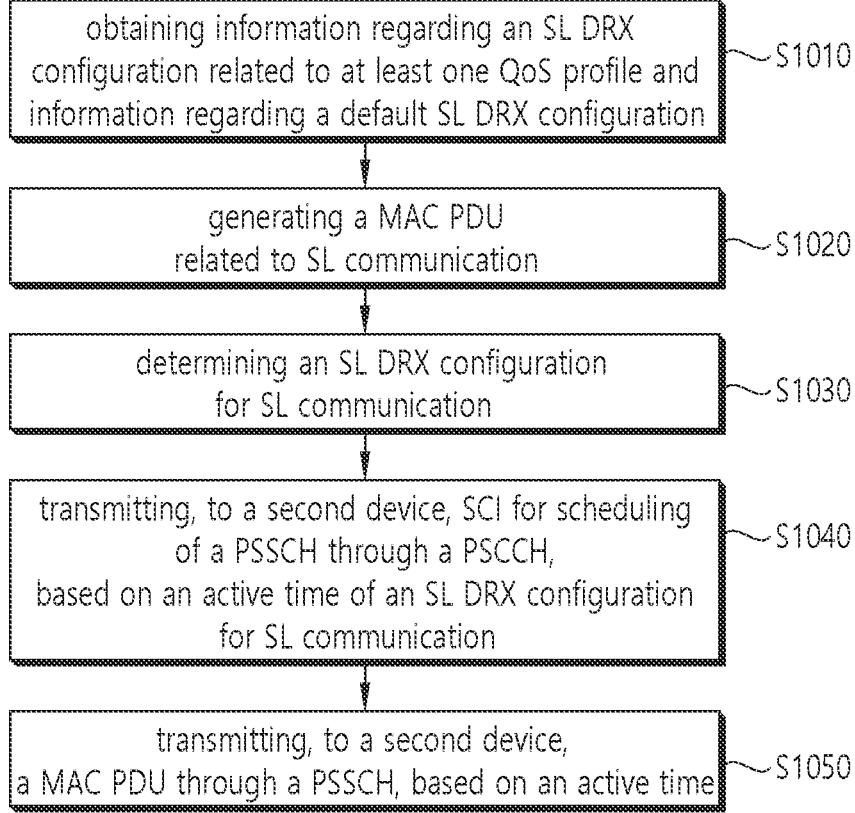

obtaining information regarding an SL DRX configuration related to at least one QoS profile and information regarding a default SL DRX configuration — S1010 generating a MAC PDU related to SL communication — S1020 determining an SL DRX configuration for SL communication — S1030 transmitting, to a second device, SCI for scheduling of a PSSCH through a PSCCH, based on an active time of an SL DRX configuration for SL communication — S1040 transmitting, to a second device, a MAC PDU through a PSSCH, based on an active time — S1050

FIG. 11

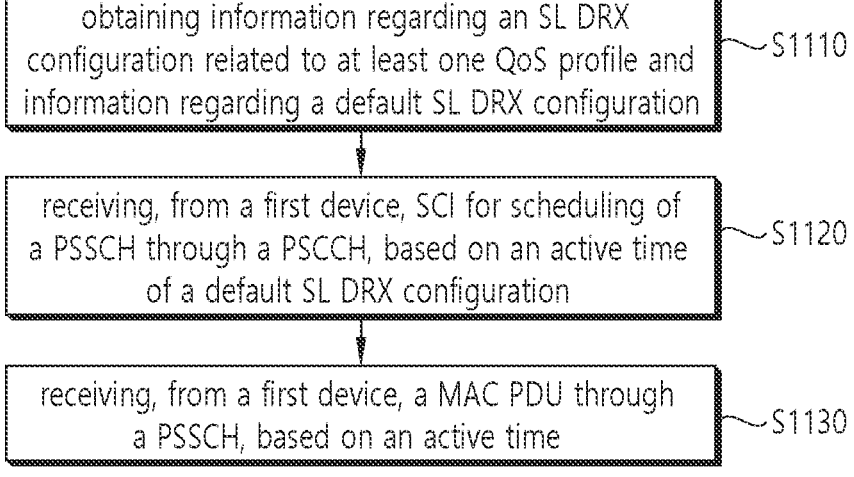

obtaining information regarding an SL DRX configuration related to at least one QoS profile and information regarding a default SL DRX configuration — S1110 receiving, from a first device, SCI for scheduling of a PSSCH through a PSCCH, based on an active time of a default SL DRX configuration — S1120 receiving, from a first device, a MAC PDU through a PSSCH, based on an active time — S1130

FIG. 12

Device (100,200)

CONFIGURATION METHOD AND APPARATUS FOR COMMON SL DRX CONFIGURATION IN NR V2X

CROSS-REFERENCE TO RELATED APPLICATIONS

This application is a National Stage application under 35 U.S.C. § 371 of International Application No. PCT/KR2022/010472, filed on Jul. 18, 2022, which claims the benefit of Korean Patent Application No. 10-2021-0093652, filed on Jul. 16, 2021, U.S. Provisional Application No. 63/229,560, filed on Aug. 5, 2021, and Korean Patent Application No. 10-2021-0154458, filed on Nov. 11, 2021. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication apparatuses require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: obtaining information regarding a sidelink (SL) discontinuous reception (DRX) configuration related to at least one quality of service (QoS) profile and information regarding a default SL DRX configuration; generating a medium access control (MAC) protocol data unit (PDU) related to SL communication; determining an SL DRX configuration for the SL communication, wherein the default SL DRX configuration may be determined as the SL DRX configuration for the SL communication, based on an SL DRX configuration mapped to a QoS profile related to the MAC PDU not being present; transmitting, to a second device, sidelink control information (SCI) for scheduling of a physical sidelink shared channel (PSSCH) through a physical sidelink control channel (PSCCH), based on an active time of the SL DRX configuration for the SL communication; and transmitting, to the second device, the MAC PDU through the PSSCH, based on the active time.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain information regarding a sidelink (SL) discontinuous reception (DRX) configuration related to at least one quality of service (QoS) profile and information regarding a default SL DRX configuration; generate a medium access control (MAC) protocol data unit (PDU) related to SL communication: determine an SL DRX configuration for the SL communication, wherein the default SL DRX configuration may be determined as the SL DRX configuration for the SL communication, based on an SL DRX configuration mapped to a QoS profile related to the MAC PDU not being present; transmit, to a second device, sidelink control information (SCI) for scheduling of a physical sidelink shared channel (PSSCH) through a physical sidelink control channel (PSCCH), based on an active time of the SL DRX configuration for the SL communication; and transmit, to the second device, the MAC PDU through the PSSCH, based on the active time.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain information regarding a sidelink (SL) discontinuous reception (DRX) configuration related to at least one quality of service (QoS) profile and information regarding a default SL DRX configuration; generate a medium access control (MAC) protocol data unit (PDU) related to SL communication: determine an SL DRX configuration for the SL communication, wherein the default SL DRX configuration may be determined as the SL DRX configuration for the SL communication, based on an SL DRX configuration mapped to a QoS profile related to the MAC PDU not being present; transmit, to a second UE, sidelink control information (SCI) for scheduling of a physical sidelink shared channel (PSSCH) through a physical sidelink control channel (PSCCH), based on an active time of the SL DRX configuration for the SL communication; and transmit, to the second UE, the MAC PDU through the PSSCH, based on the active time.

According to an embodiment of the present disclosure, a non-transitory computer-readable storage medium storing instructions may be proposed. that, when executed, cause a first device to: obtain information regarding a sidelink (SL) discontinuous reception (DRX) configuration related to at least one quality of service (QoS) profile and information regarding a default SL DRX configuration; generate a medium access control (MAC) protocol data unit (PDU) related to SL communication: determine an SL DRX configuration for the SL communication, wherein the default SL DRX configuration may be determined as the SL DRX configuration for the SL communication, based on an SL DRX configuration mapped to a QoS profile related to the MAC PDU not being present; transmit, to a second device, sidelink control information (SCI) for scheduling of a physical sidelink shared channel (PSSCH) through a physical sidelink control channel (PSCCH), based on an active time of the SL DRX configuration for the SL communication; and transmit, to the second device, the MAC PDU through the PSSCH, based on the active time.

According to an embodiment of the present disclosure, a method for performing, by a second device, wireless communication may be proposed. For example, the method may comprise: obtaining information regarding a sidelink (SL) discontinuous reception (DRX) configuration related to at least one quality of service (QoS) profile and information regarding a default SL DRX configuration; receiving, from a first device, sidelink control information (SCI) for scheduling of a physical sidelink shared channel (PSSCH) through a physical sidelink control channel (PSCCH), based on an active time of the default SL DRX configuration; and receiving, from the first device, a medium access control (MAC) protocol data unit (PDU) through the PSSCH, based on the active time, wherein the MAC PDU may be received based on the active time of the default SL DRX configuration, based on an SL DRX configuration mapped to a QoS profile related to the MAC PDU not being present.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain information regarding a sidelink (SL) discontinuous reception (DRX) configuration related to at least one quality of service (QoS) profile and information regarding a default SL DRX configuration: receive, from a first device, sidelink control information (SCI) for scheduling of a physical sidelink shared channel (PSSCH) through a physical sidelink control channel (PSCCH), based on an active time of the default SL DRX configuration; and receive, from the first device, a medium access control (MAC) protocol data unit (PDU) through the PSSCH, based on the active time, wherein the MAC PDU may be received based on the active time of the default SL DRX configuration, based on an SL DRX configuration mapped to a QoS profile related to the MAC PDU not being present.

A UE can efficiently perform sidelink communication.

BRIEF DESCRIPTION OF THE DRAWINGS

FIG. 2 shows a radio protocol architecture, based on an embodiment of the present disclosure.

FIG. 4 shows a structure of a slot of an NR frame, based on an embodiment of the present disclosure.

FIG. 8 shows an embodiment of a configuring of a default/common SL DRX configuration, according to one embodiment of the present disclosure.

FIG. 10 shows a procedure for a first device to perform wireless communication, according to one embodiment of the present disclosure.

FIG. 11 shows a procedure for a second device to perform wireless communication, according to one embodiment of the present disclosure.

FIG. 12 shows a communication system 1, based on an embodiment of the present disclosure.

DETAILED DESCRIPTION

Figure 1:
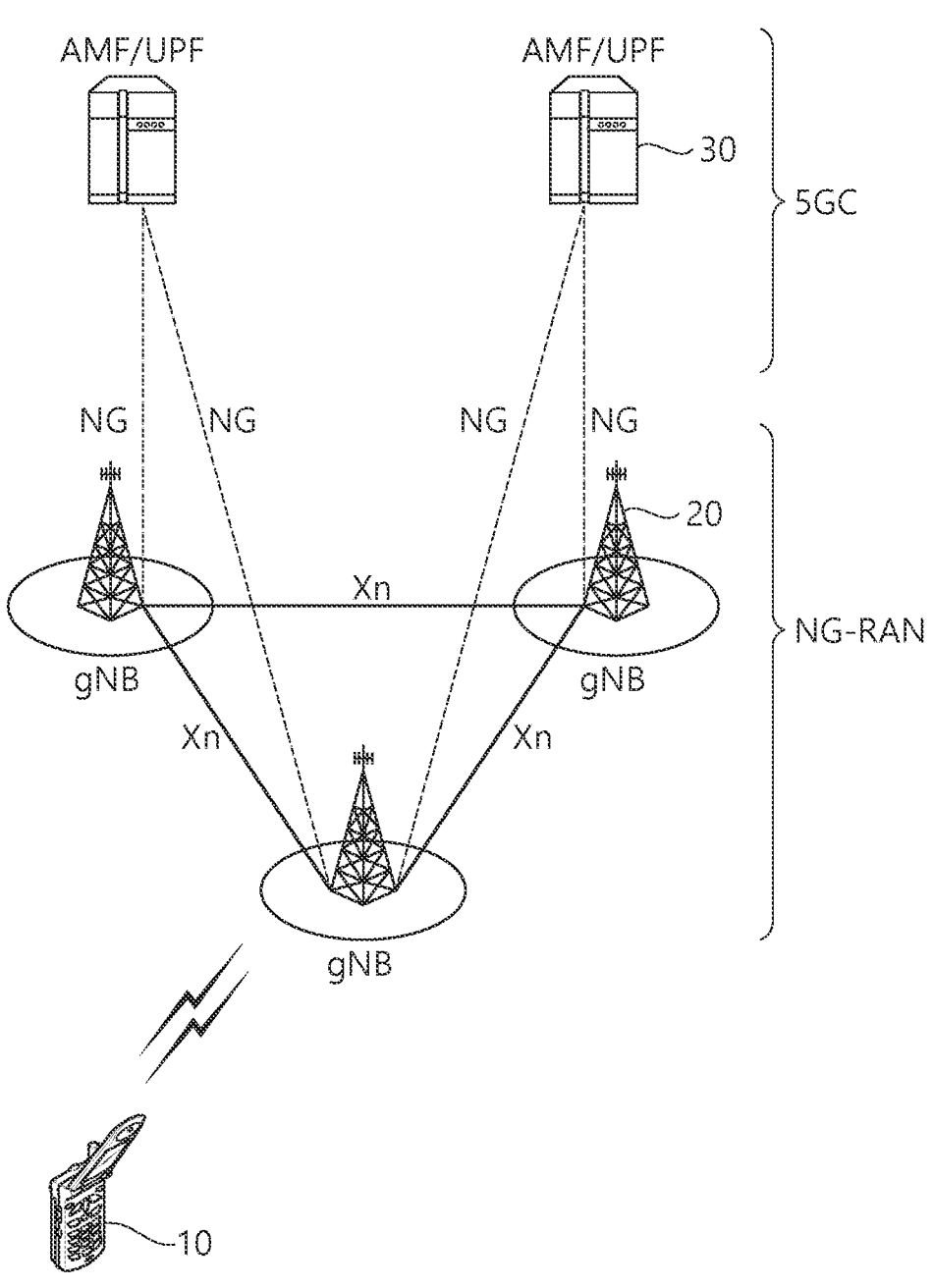
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A. B. or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A. B. or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques used herein that are not specifically described, reference may be made to wireless communication standards documents published prior to the filing of this specification.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system inter-connection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
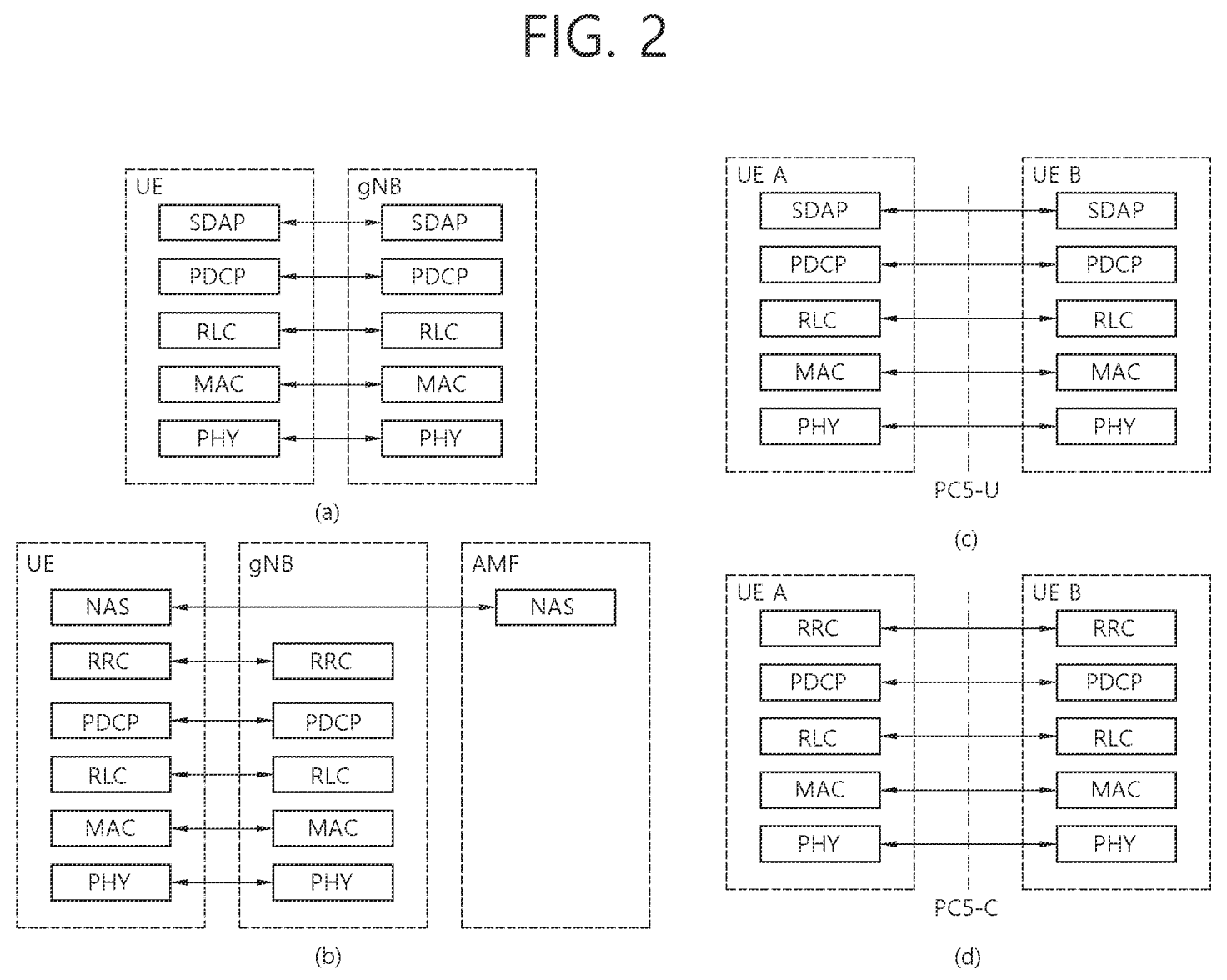

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication, (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers. i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
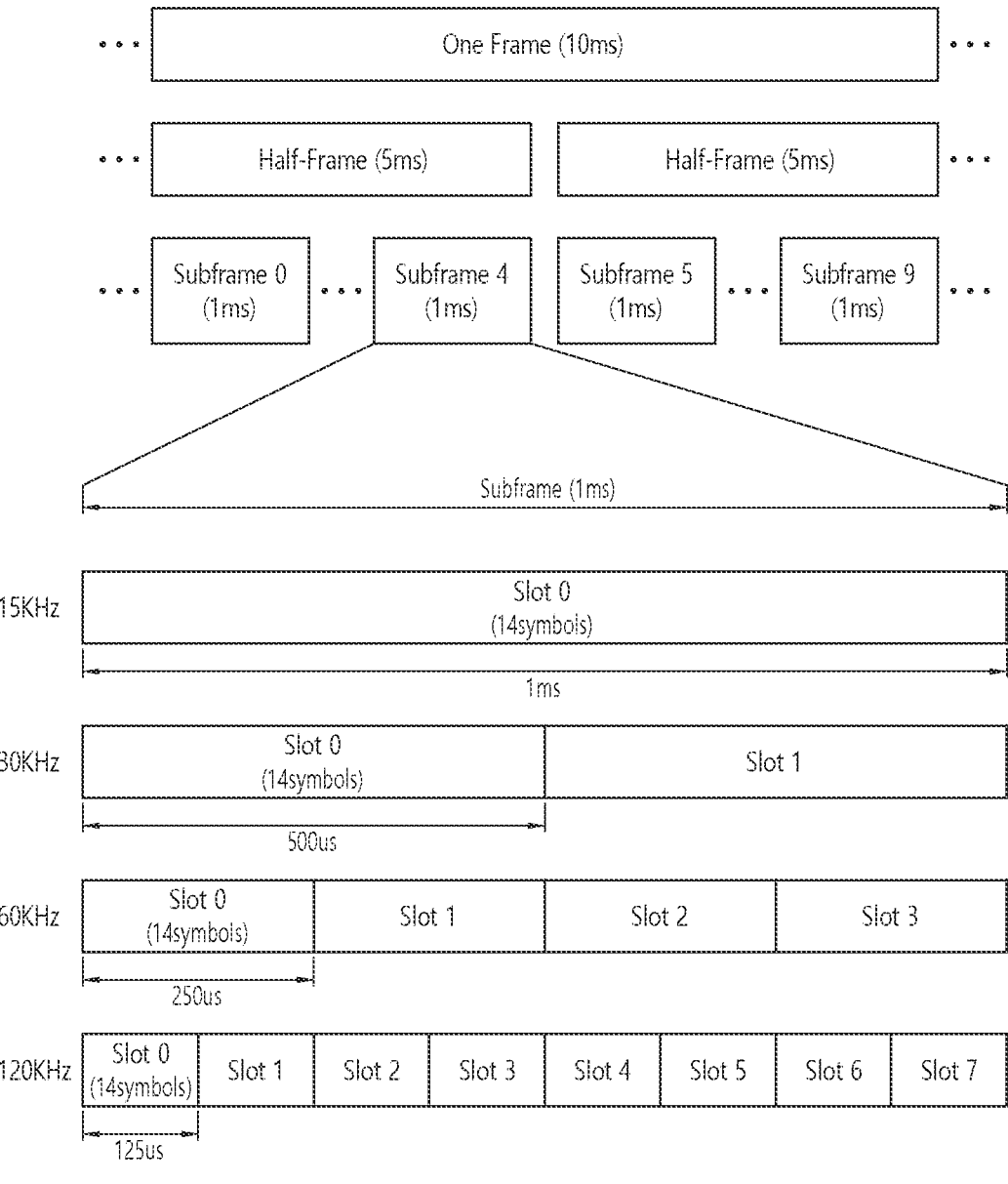
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2^u^) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2^u^) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
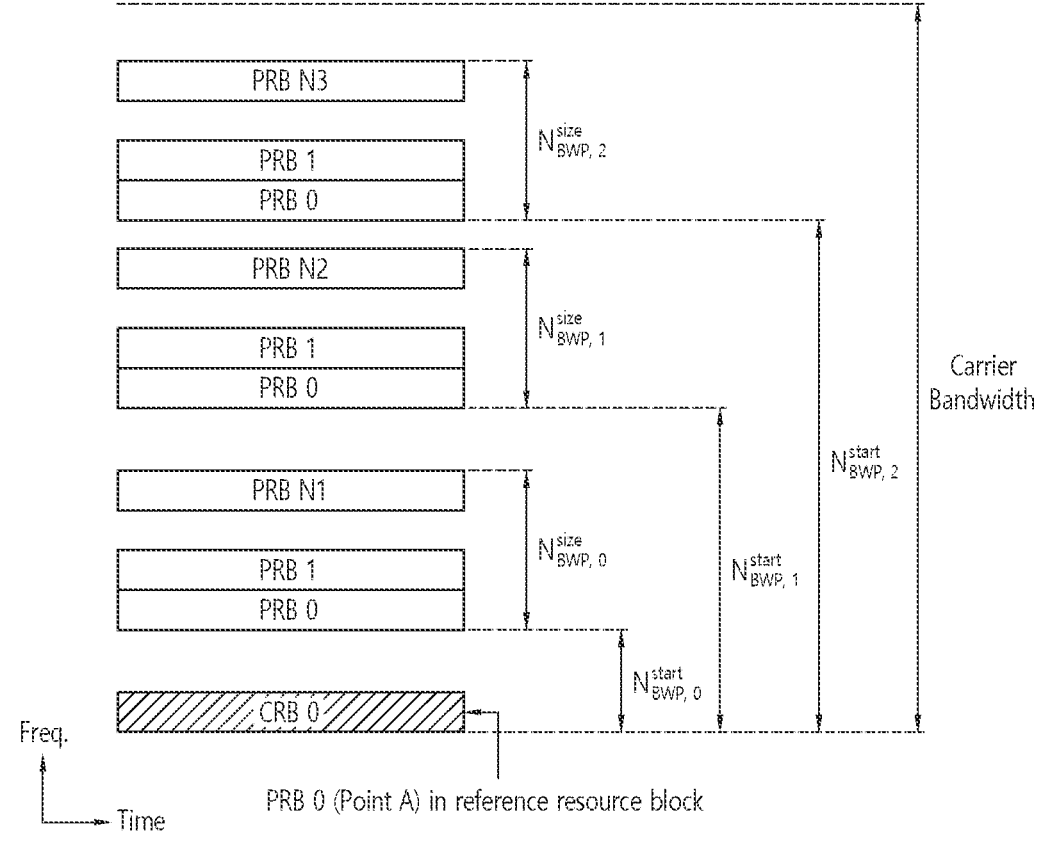
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A. and a bandwidth $N^{start}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
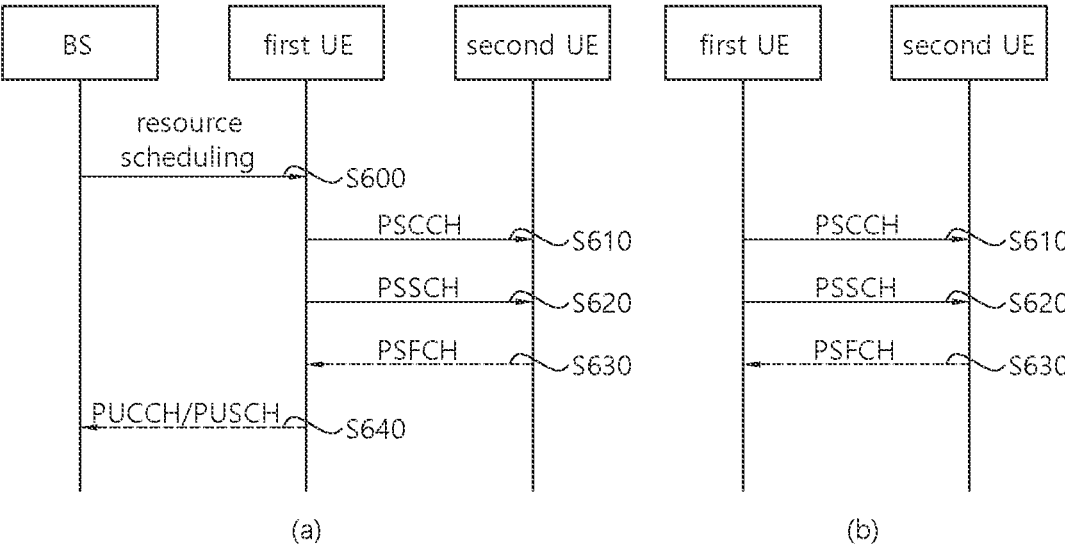
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1$^{st}$-stage SCI) to a second UE based on the resource scheduling. In step S620, the first UE may transmit a PSSCH (e.g., 2$^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1$^{st}$-stage SCI) to a second UE by using the resource(s). In step S620, the first UE may transmit a PSSCH (e.g., 2$^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1$^{st}$ SCI, a first SCI, a 1$^{st}$-stage SCI or a 1$^{st}$-stage SCI format, and a SCI transmitted through a PSSCH may be referred to as a 2$^{nd}$ SCI, a second SCI, a 2$^{nd}$-stage SCI or a 2$^{nd}$-stage SCI format. For example, the 1$^{st}$-stage SCI format may include a SCI format 1-A, and the 2$^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2(N^{SL}_{subChannel}(N^{SL}_{subChannel}+1)/2))$ bits when the value of the higher layer parameter sl-MaxNumPerReserve is configured to 2; otherwise ceiling $\log_2 (N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

TABLE 6

| Value of the Number of DMRS port field | Antenna ports |
| --- | --- |
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
| --- | --- |
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described. SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
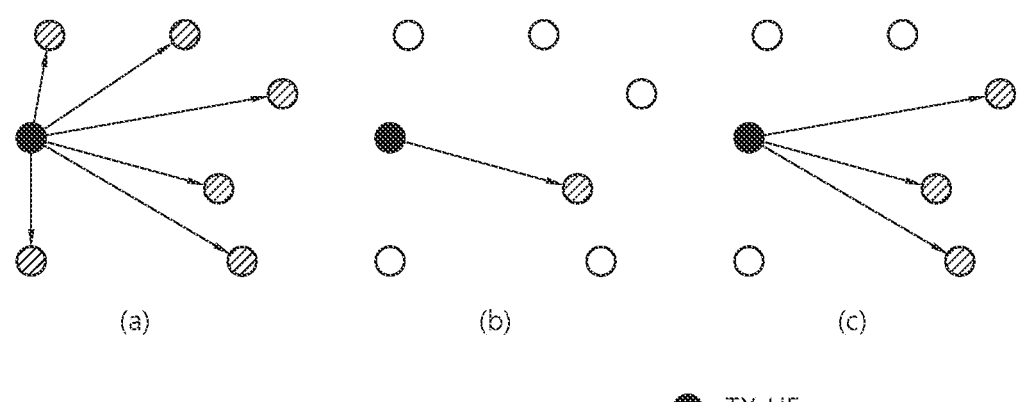
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, FIG. 7(a) shows a broadcast type of SL communication, FIG. 7(b) shows a unicast type of SL communication, and FIG. 7(c) shows a groupcast type of SL communication. In the case of unicast type SL communication, a UE may perform one-to-one communication with other UEs. In the case of groupcast type SL communication, a UE may perform SL communication with one or more UEs in a group to which it belongs. In various embodiments of the present disclosure, SL groupcast communication may be replaced by SL multicast communication, SL one-to-many communication, and the like.

In this specification, the wording "configuration or definition" may be interpreted as being configured (in advance) by a base station or network (e.g., through predefined signaling (e.g., SIB signaling, MAC signaling, RRC signaling). For example, "A may be configured" may include "a base station or network (pre)configures/defines or informs the UE of A". Alternatively, the wording "configuration or definition" may be interpreted as being configured or defined in advance by the system. For example, "A may be configured" may include "A is configured/defined in advance by the system".

Referring to the standard document, some procedures and technical specifications related to this disclosure are shown in below.

TABLE 8

3GPP TS 38.321 V16.2.1

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX TABLE 8-continued

3GPP TS 38.321 V16.2.1 operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not
           configured.

RRC controls DRX operation by configuring the following parameters:

- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

TABLE 9

When a DRX cycle is configured, the Active Time for Serving Cells in a DRX group includes the time while:

- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
    2> start the drx-HARQ-RTT-TimerDL for the corresponding HARQ process in the first symbol after the end of the corresponding transmission carrying the DL HARQ feedback;
    2> stop the drx-RetransmissionTimerDL for the corresponding HARQ process.
1> if a MAC PDU is transmitted in a configured uplink grant and LBT failure indication is not received from lower layers:
    2> start the drx-HARQ-RTT-TimerUL for the corresponding HARQ process in the first symbol after the end of the first repetition of the corresponding PUSCH transmission;
    2> stop the drx-RetransmissionTimerUL for the corresponding HARQ process.
1> if a drx-HARQ-RTT-TimerDL expires:
    2> if the data of the corresponding HARQ process was not successfully decoded:
        3> start the drx-RetransmissionTimerDL for the corresponding HARQ process in the first symbol after the expiry of drx-HARQ-RTT-TimerDL.
1> if a drx-HARQ-RTT-TimerUL expires:
    2> start the drx-RetransmissionTimerUL for the corresponding HARQ process in the first symbol after the expiry of drx-HARQ-RTT-TimerUL.

TABLE 9-continued

```
1>  if a DRX Command MAC CE or a Long DRX Command MAC CE is received:
    2>  stop drx-onDurationTimer for each DRX group;
    2>  stop drx-InactivityTimer for each DRX group.
1>  if drx-InactivityTimer for a DRX group expires:
    2>  if the Short DRX cycle is configured:
        3>  start or restart drx-ShortCycleTimer for this DRX group in the first symbol after the expiry of
            drx-InactivityTimer;
        3>  use the Short DRX cycle for this DRX group.
    2>  else:
        3>  use the Long DRX cycle for this DRX group.
1>  if a DRX Command MAC CE is received:
    2>  if the Short DRX cycle is configured:
        3>  start or restart drx-ShortCycleTimer for each DRX group in the first symbol after the end of
            DRX Command MAC CE reception;
        3>  use the Short DRX cycle for each DRX group.
    2>  else:
        3>  use the Long DRX cycle for each DRX group.
```

TABLE 10

```
1>  if drx-ShortCycleTimer for a DRX group expires:
    2>  use the Long DRX cycle for this DRX group.
1>  if a Long DRX Command MAC CE is received:
    2>  stop drx-ShortCycleTimer for each DRX group;
    2>  use the Long DRX cycle for each DRX group.
1>  if the Short DRX cycle is used for a DRX group, and [(SFN × 10) + subframe number] modulo (drx-
    ShortCycle) = (drx-StartOffset) modulo (drx-ShortCycle):
    2>  start drx-onDurationTimer for this DRX group after drx-SlotOffset from the beginning of the
        subframe.
1>  if the Long DRX cycle is used for a DRX group, and [(SFN × 10) + subframe number] modulo (drx-
    LongCycle) = drx-StartOffset:
    2>  if DCP monitoring is configured for the active DL BWP as specified in TS 38.213 [6], clause
        10.3:
        3>  if DCP indication associated with the current DRX cycle received from lower layer indicated
            to start drx-onDurationTimer, as specified in TS 38.213 [6]; or
        3>  if all DCP occasion(s) in time domain, as specified in TS 38.213 [6], associated with the
            current DRX cycle occurred in Active Time considering grants/assignments/DRX Command
            MAC CE/Long DRX Command MAC CE received and Scheduling Request sent until 4 ms
            prior to start of the last DCP occasion, or within BWP switching interruption length, or during
            a measurement gap, or when the MAC entity monitors for a PDCCH transmission on the
            search space indicated by recoverySearchSpaceId of the SpCell identified by the C-RNTI
            while the ra-ResponseWindow is running (as specified in clause 5.1.4); or
        3>  if ps-Wakeup is configured with value true and DCP indication associated with the current
            DRX cycle has not been received from lower layers:
            4>  start drx-onDurationTimer after drx-SlotOffset from the beginning of the subframe.
    2>  else:
        3>  start drx-onDurationTimer for this DRX group after drx-SlotOffset from the beginning of the
            subframe.
NOTE 2:   In case of unaligned SFN across carriers in a cell group, the SFN of the SpCell is used to
          calculate the DRX duration.
1>  if a DRX group is in Active Time:
    2>  monitor the PDCCH on the Serving Cells in this DRX group as specified in TS 38.213 [6];
    2>  if the PDCCH indicates a DL transmission:
        3>  start the drx-HARQ-RTT-TimerDL for the corresponding HARQ process in the first symbol
            after the end of the corresponding transmission carrying the DL HARQ feedback;
NOTE 3:   When HARQ feedback is postponed by PDSCH-to-HARQ_feedback timing indicating a non-
          numerical k1 value, as specified in TS 38.213 [6], the corresponding transmission opportunity
          to send the DL HARQ feedback is indicated in a later PDCCH requesting the HARQ-ACK
          feedback.
        3>  stop the drx-RetransmissionTimerDL for the corresponding HARQ process.
        3>  if the PDSCH-to-HARQ_feedback timing indicate a non-numerical k1 value as specified in
            TS 38.213 [6]:
            4>  start the drx-RetransmissionTimerDL in the first symbol after the PDSCH transmission for
                the corresponding HARQ process.
```

TABLE 11

```
    2>  if the PDCCH indicates a UL transmission:
        3>  start the drx-HARQ-RTT-TimerUL for the corresponding HARQ process in the first symbol
            after the end of the first repetition of the corresponding PUSCH transmission;
        3>  stop the drx-RetransmissionTimerUL for the corresponding HARQ process.
```

TABLE 11-continued

```
        2>  if the PDCCH indicates a new transmission (DL or UL) on a Serving Cell in this DRX group:
            3>  start or restart drx-InactivityTimer for this DRX group in the first symbol after the end of the
                PDCCH reception.
        2>  if a HARQ process receives downlink feedback information and acknowledgement is indicated:
            3>  stop the drx-RetransmissionTimerUL for the corresponding HARQ process.
    1>  if DCP monitoring is configured for the active DL BWP as specified in TS 38.213 [6], clause 10.3;
        and
    1>  if the current symbol n occurs within drx-onDurationTimer duration; and
    1>  if drx-onDurationTimer associated with the current DRX cycle is not started as specified in this
        clause:
        2>  if the MAC entity would not be in Active Time considering grants/assignments/DRX Command
            MAC CE/Long DRX Command MAC CE received and Scheduling Request sent until 4 ms prior
            to symbol n when evaluating all DRX Active Time conditions as specified in this clause:
            3>  not transmit periodic SRS and semi-persistent SRS defined in TS 38.214 [7];
            3>  not report semi-persistent CSI configured on PUSCH;
            3>  if ps-TransmitPeriodicL1-RSRP is not configured with value true:
                4>  not report periodic CSI that is L1-RSRP on PUCCH.
            3>  if ps-TransmitOtherPeriodicCSI is not configured with value true:
                4>  not report periodic CSI that is not L1-RSRP on PUCCH.
    1>  else:
        2>  in current symbol n, if a DRX group would not be in Active Time considering grants/assignments
            scheduled on Serving Cell(s) in this DRX group and DRX Command MAC CE/Long DRX
            Command MAC CE received and Scheduling Request sent until 4 ms prior to symbol n when
            evaluating all DRX Active Time conditions as specified in this clause:
            3>  not transmit periodic SRS and semi-persistent SRS defined in TS 38.214 [7] in this DRX
                group;
            3>  not report CSI on PUCCH and semi-persistent CSI configured on PUSCH in this DRX group.
        2>  if CSI masking (csi-Mask) is setup by upper layers:
            3>  in current symbol n, if drx-onDurationTimer of a DRX group would not be running
                considering grants/assignments scheduled on Serving Cell(s) in this DRX group and DRX
                Command MAC CE/Long DRX Command MAC CE received until 4 ms prior to symbol n
                when evaluating all DRX Active Time conditions as specified in this clause; and
                4>  not report CSI on PUCCH in this DRX group.
    NOTE 4:    If a UE multiplexes a CSI configured on PUCCH with other overlapping UCI(s) according to
               the procedure specified in TS 38.213 [6] clause 9.2.5 and this CSI multiplexed with other
               UCI(s) would be reported on a PUCCH resource outside DRX Active Time of the DRX group
               in which this PUCCH is configured, it is up to UE implementation whether to report this CSI
               multiplexed with other UCI(s).
Regardless of whether the MAC entity is monitoring PDCCH or not on the Serving Cells in a DRX group,
the MAC entity transmits HARQ feedback, aperiodic CSI on PUSCH, and aperiodic SRS defined in TS
38.214 [7] on the Serving Cells in the DRX group when such is expected.
The MAC entity needs not to monitor the PDCCH if it is not a complete PDCCH occasion (e.g. the Active
Time starts or ends in the middle of a PDCCH occasion).
```

NR V2X in Release 16 did not support power saving operations for UEs, and Release 17 NR V2X will support power saving operations for UEs (e.g., pedestrian UEs).

For example, an SL DRX configuration for power saving operation of a UE (e.g., SL DRX operation) may need to be defined.

Thus, in an embodiment(s) of the present disclosure, an SL DRX configuration for a power saving operation of a UE is defined, and a method is proposed for enabling a UE to smoothly perform an SL DRX operation using the defined SL DRX configuration. In the following description, "when, if, in case of" may be replaced with "based on".

According to one embodiment of the present disclosure, (Proposal 1.) a method is proposed for performing an SL DRX operation using a common SL DRX configuration by defining one default/common SL DRX configuration based on the QoS requirements (e.g., PC5 QoS flow identifier (PCI), packet delay budget (PDB)) of a V2X service or SL service, so that a UE may perform the SL DRX operation using the common SL DRX configuration.

Figure 8:
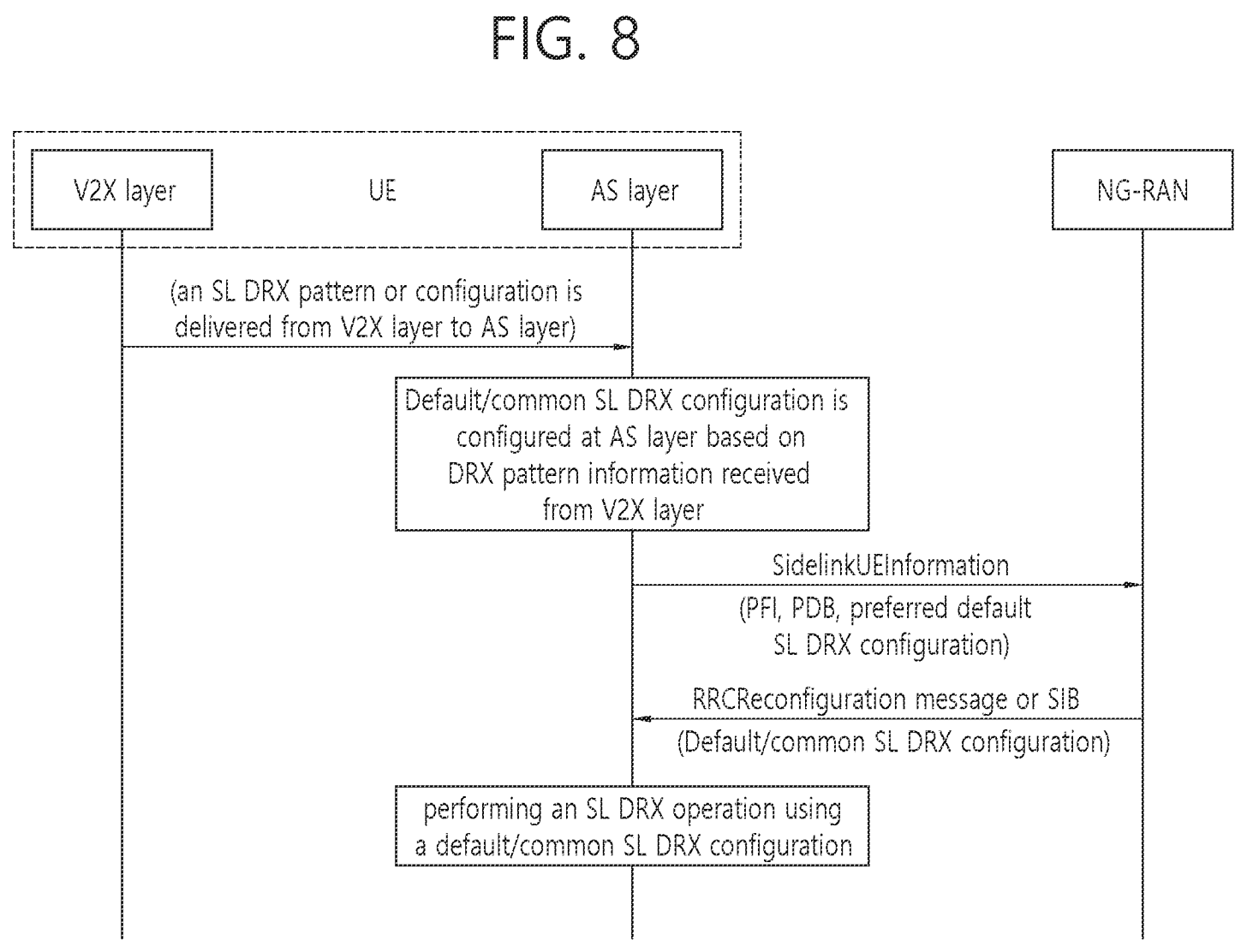

FIG. 8 shows an embodiment of a configuring of a default/common SL DRX configuration, according to one embodiment of the present disclosure. The embodiment of FIG. 8 may be combined with various embodiments of the present disclosure.

Referring to FIG. 8, an embodiment of configuring one default/common SL DRX configuration for a UE based on QoS requirements (e.g., PQI, PDB) of a V2X service or SL service is shown. First, (step 1) a V2X layer of a UE may generate and deliver to the AS layer an SL DRX pattern (e.g., SL DRX cycle, SL DRX on-duration) information for an SL DRX operation of the UE based on the QoS requirements (e.g., PDB) of a V2X service generated by the application layer, or may generate and deliver to the AS layer an SL DRX configuration.

TABLE 12

Sidelink DRX configurations

✓ SL drx-onDurationTimer: the duration at the beginning of a DRX Cycle;
✓ SL drx-SlotOffset: the delay before starting the drx-onDurationTimer;
✓ SL drx-InactivityTimer: the duration after the PSCCH occasion in which a PSCCH indicates a
  new SL transmission for the MAC entity;
✓ SL drx-RetransmissionTimer (per Sidelink process): the maximum duration until a
  retransmission is received;

TABLE 12-continued

Sidelink DRX configurations

✓ SL drx-LongCycleStartOffset: the Long DRX cycle and drx-StartOffset which defines the
   subframe where the Long and Short DRX Cycle starts;
✓ SL drx-ShortCycle (optional): the Short DRX cycle;
✓ SL drx-ShortCycleTimer (optional): the duration the UE shall follow the Short DRX cycle; SL
   drx-HARQ-RTT-Timer (per Sidelink process): the minimum duration before an assignment for
   HARQ retransmission is expected by the MAC entity.

And (step 2) the AS layer of the UE may generate a default/common SL DRX configuration based on the SL DRX pattern information ("SL DRX cycle and SL DRX on-duration length" or "SL DRX on-duration length and SL DRX off-duration length") received from the V2X layer, and use it for SL DRX operation.

Then, (step 3) the UE may deliver the QoS requirement information (PFI, PDB) for the V2X service of the UE and the preferred default/common SL DRX configuration to a base station. For example, if steps 1 and 2 are omitted, only the QoS requirement information for the V2X service may be delivered to the base station, and the base station may generate and inform UEs of the common SL DRX configuration information to be used by the UEs based on that information.

Then, (step 4) the UE can perform an SL DRX operation and sidelink transmission/reception using the common SL DRX configuration received from the base station.

According to one embodiment of the present disclosure (Proposal 2.), if only one default/common SL DRX configuration is allowed based on the QoS requirements (e.g., PQI, PDB) of the V2X service or SL service, a problem may arise in that the probability of resource collision between different UEs in the SL DRX on-duration interval of the SL DRX configuration, and the level of congestion/interference may increase. Therefore, a method for reducing the probability of resource collision between different UEs in the SL DRX on-duration interval of a common SL DRX configuration is proposed in this disclosure as follows.

According to one embodiment of the present disclosure, (Proposal 2. 1) by defining a wake up starting time point (SL DRX on-duration starting time point) or a wake up duration (SL DRX on-duration length) of a period that a wake up interval of a common SL DRX configuration (e.g., SL DRX on-duration) is repeated (common SL DRX cycle) to be hopped/randomized based on parameters such as application/service ID (and/or (Layer 1 or Layer 2)(source/destination) ID), the probability of resource conflicts between different UEs operating SL DRX may be reduced.

According to one embodiment of the present disclosure, (Proposal 2. 2) a plurality of common SL DRX configurations may be allowed specifically for a V2X or SL service/QoS, but one of them may be randomly selected (or selected by UE implementation), or a common SL DRX configuration with a relatively low interference level may be preferentially selected (or one of the common SL DRX configurations below a pre-configured service/QoS-specific threshold value may be randomly selected), based on interference levels, etc., measured (in the past), in a received slot related to a wake-up interval (e.g., common SL DRX on-duration) of the common SL DRX configuration.

According to one embodiment of the present disclosure (Proposal 3), in addition to randomizing the default/common SL DRX configuration (or, default/common SL DRX pattern) or the SL DRX-related parameters included in the default/common SL DRX configuration, if the conditions described in the proposal (e.g., a situation where the resource collision probability between different UEs, the degree of congestion/interference increases, the resource collision probability between different UEs exceeds a threshold value, or the degree of congestion/interference between different UEs exceeds a threshold value) are satisfied, a UE may increase an SL DRX on-duration (or active time interval) or cause an SL DRX timer value configured separately in advance (e.g., a relatively large value) to be applied (e.g., the SL DRX timers included in an SL DRX configuration referred to in this disclosure, or other SL DRX-related timers defined to support SL DRX operation), (i.e., in the form of increasing the time domain of candidate resources, for example, to select resources with less interference).

According to one embodiment of the present disclosure (Proposal 4), when switching from a selected default/common SL DRX configuration (or, default/common SL DRX pattern) or SL DRX-related parameter included in the default/common SL DRX configuration to another default/common SL DRX configuration (or, default/common SL DRX pattern) or SL DRX-related parameter included in the default/common SL DRX configuration, a congestion/interference level hysteresis may be configured. For example, a UE may be allowed to switch to a new common SL DRX configuration or common SL DRX pattern or parameters of a common SL DRX configuration only if the difference between the congestion/interference levels in the old and new configuration or in the old and new pattern is greater than a pre-configured hysteresis value and, at the same time, the congestion/interference levels in the new configuration or new pattern are lower than a pre-configured threshold value. Additionally, for example, switching to a different configuration or pattern may be configured to be allowed only when a resource reselection is triggered, or when a TB related retransmission is completed, or when the UE is operating in long DRX operation, or when the UE is operating on an SL on-duration basis due to the expiration of a timer.

According to one embodiment of the present disclosure (Proposal 5), when an SL DRX on-duration or active interval (during which a UE is operating in a wake-up state to receive or transmit sidelink signaling including SL DRX on-duration) related to a higher priority/requirement service overlaps (partially) with an SL DRX on-duration or active interval related to a service of lower priority/requirement, in order to reduce interference to the service of the higher priority/requirement (within that overlapping interval), an upper bound value of the (maximum or minimum or average) transmit power, a (maximum) number of TB-related retransmissions, the Channel occupancy Ratio (CR) value, etc. used for the transmission of the lower priority/requirement service may be configured.

According to one embodiment of the present disclosure (Proposal 6), when the zone region in which a UE is located changes (or when the zone ID in which the UE is located changes), randomization for the selection of a common SL DRX configuration/a common SL DRX pattern/an SL DRX operation parameter and a timer included in a common SL DRX configuration/a configuration, a pattern, and a DRX operation parameter included in the configuration may be triggered or enabled.

According to one embodiment of this disclosure, (Proposal 7) when a UE changes from in-coverage (INC) to out-of-coverage (OOC) state, or when a UE changes from OOC to INC state, randomization for the selection of a common SL DRX configuration/a common SL DRX pattern/ an SL DRX operation parameter and a timer included in a common SL DRX configuration/a configuration, a pattern, and a DRX operation parameter included in the configuration may be triggered or enabled.

According to one embodiment of the present disclosure (Proposal 8), when the cell ID in which a UE is located changes, randomization for the selection of a common SL DRX configuration/a common SL DRX pattern/an SL DRX operation parameter and a timer included in a common SL DRX configuration/a configuration, a pattern, and a DRX operation parameter included in the configuration may be triggered or enabled.

According to one embodiment of the present disclosure (Proposal 9), when a UE's carrier type (e.g., licensed carrier, ITS-dedicated carrier) changes, randomization for the selection of a common SL DRX configuration/a common SL DRX pattern/an SL DRX operation parameter and a timer included in a common SL DRX configuration/a configuration, a pattern, and a DRX operation parameter included in the configuration may be triggered or enabled.

According to one embodiment of the present disclosure (Proposal 10), when a UE's communication type/direction (e.g., V2P, P2P, P2V) changes, randomization for the selection of a common SL DRX configuration/a common SL DRX pattern/an SL DRX operation parameter and a timer included in a common SL DRX configuration/a configuration, a pattern, and a DRX operation parameter included in the configuration may be triggered or enabled.

According to one embodiment of the present disclosure (Proposal 11), when the amount of remaining battery in a UE changes, randomization for the selection of a common SL DRX configuration/a common SL DRX pattern/an SL DRX operation parameter and a timer included in a common SL DRX configuration/a configuration, a pattern, and a DRX operation parameter included in the configuration may be triggered or enabled.

According to one embodiment of the present disclosure (Proposal 12), when a UE's V2X (or SL) service ID/type changes, randomization for the selection of a common SL DRX configuration/a common SL DRX pattern/an SL DRX operation parameter and a timer included in a common SL DRX configuration/a configuration, a pattern, and a DRX operation parameter included in the configuration may be triggered or enabled.

In addition, w % ben (default/common) SL DRX pattern/ configuration information (e.g., SL DRX cycle, SL DRX on-duration interval information, etc.) is exchanged through higher layer signaling (e.g., MAC CE, PC5 RRC), a mechanism may be required to ensure that UEs have a common understanding of "(default/common) SL DRX pattern/configuration starting time point (e.g., SL DRX on-duration starting time point)".

Thus, according to one embodiment of the present disclosure (Proposal 13), an SL DRX confirmation message (e.g., a message reporting SL DRX pattern/configuration information, or an ACK message to an SL DRX pattern/ configuration report message) is defined and a method of considering the time point at which it is received by a UE to be the reference timing (e.g., the start of the SL DRX on-duration), or, signaling information regarding the SL DRX pattern related reference timing through additional higher layer signaling (e.g., SL DRX confirmation message, SIB, DL only RRC message, PC5 RRC message), or considering the time point when the pre-configured/exchanged slot offset value from the SYNC source based DFN 0 is applied as the reference timing, etc. is proposed.

According to one embodiment of the present disclosure, (Proposal 14) a common SL DRX configuration/parameter proposed in the present disclosure may be a DRX configuration that is used in common with all UEs regardless of the cast type (unicast or groupcast or broadcast). Alternatively, for example, a common SL DRX configuration/parameter proposed in this disclosure may be a DRX configuration that is configured for a specific cast type (unicast or groupcast or broadcast). Alternatively, for example, a common SL DRX configuration/parameter proposed in this disclosure may be a DRX configuration commonly used by UEs belonging to (subscribing to) the same groupcast (groupcast service with the same groupcast destination L2 ID) or unicast (unicast with the same pair of a source L2 ID/destination L2 ID) or broadcast (broadcast service with the same broadcast destination L2 ID) service.

Alternatively, for example, a common SL DRX configuration/parameter proposed herein may be a DRX configuration configured for a specific cast type (unicast or groupcast or broadcast). For example, a common SL DRX configuration/parameter proposed in this disclosure may be a DRX configuration commonly used by UEs interested in the same groupcast or the same unicast or the same broadcast service. For example, UEs interested in the same groupcast or same unicast or same broadcast service may be UEs that are not yet subscribed or connected (in the case of unicast) to a service of that cast type and are interested in subscribing to a service of that cast type and are in a state to monitor the signaling of that service. Alternatively, for example, a common SL DRX configuration/parameter proposed in this disclosure may be a UE service specific DRX configuration that UEs use in common.

According to one embodiment of the present disclosure (Proposal 15), a common SL DRX configuration/parameter proposed in the present disclosure may be a DRX configuration that is used in common with all UEs regardless of the cast type (unicast or groupcast or broadcast). Alternatively, for example, a common SL DRX configuration/parameter proposed in this disclosure may be a DRX configuration configured for a specific cast type (unicast or groupcast or broadcast). Alternatively, for example, a common SL DRX configuration/parameter proposed in this disclosure may be a DRX configuration commonly used by UEs belonging to (subscribing to) the same groupcast or the same unicast or the same broadcast service.

Alternatively, for example, a common SL DRX configuration/parameter proposed herein may be a DRX configuration configured for a specific cast type (unicast or groupcast or broadcast). For example, a common SL DRX configuration/parameter proposed in this disclosure may be a common DRX configuration used by UEs interested in the same groupcast or the same unicast or the same broadcast service. For example, UEs interested in the same groupcast or same unicast or same broadcast service may be UEs that are not yet subscribed or connected (in the case of unicast) to a service of that cast type and are interested in subscribing to a service of that cast type and are in a state to monitor the signaling of that service. Alternatively, for example, a common SL DRX configuration/parameter proposed in this disclosure may be a UE service specific DRX configuration that UEs use in common.

According to one embodiment of the present disclosure, the common SL DRX configuration commonly used by UEs or the UE service specific SL DRX configuration commonly used by UEs, as specified in Proposal 15 above, may be configured and set in any combination of the following.

For example, (method 1) a common SL DRX configuration or UE service specific SL DRX configuration may be configured per cast type (unicast service or groupcast service or broadcast service).

For example, (method 2) a common SL DRX configuration or UE service specific SL DRX configuration may be configured per a pair of source/destination (source (L2 or L1 ID)/destination (L2 or L1ID)).

For example, (method 3) a common SL DRX configuration or UE service specific SL DRX configuration may be configured per service (or PQI or PDB).

For example, (method 4) a common SL DRX configuration or UE service specific SL DRX configuration may be configured per service (or, PS ID (provider service identifier)).

For example, (method 5) a common SL DRX configuration or UE service specific SL DRX configuration may be configured per (or, the combination of) cast type (unicast, or, groupcast, or, broadcast) per service (or, PQI, or, PSID).

For example, (method 6) (in the case of a groupcast or broadcast,) a common SL DRX configuration or a UE service specific SL DRX configuration may be configured per (or in combination of) destination (groupcast ID, or, broadcast ID) per service (or, PQI, or, PSID).

For example, a common SL DRX configuration or a UE service specific SL DRX configuration may be configured per destination L2 ID, since the destination L2 ID may be used as an identifier to differentiate between groupcast/broadcast services, here, for each destination L2 ID, a common SL DRX configuration or a UE service specific SL DRX configuration which reflects the PQI of the SL data may be configured.

For example, (method 7) (in the case of a groupcast or broadcast,) a common SL DRX configuration or a UE service specific SL DRX configuration may be configured per (or in combination of) pair of source/destination (source (L2 or L1 ID)/destination (L2 or L1 ID)) per service (or, PQI, or, PSID).

For example, a common SL DRX configuration or a UE service specific SL DRX configuration may be configured per destination L2 ID, since the destination L2 ID may be used as an identifier to differentiate between groupcast/broadcast services, here, for each pair of source L2 ID/destination L2 ID between UEs receiving a groupcast/broadcast service and a transmitting UE transmitting the groupcast/broadcast service, a common SL DRX configuration or a UE service specific SL DRX configuration which reflects the PQI of the SL data may be configured.

Furthermore, for example, a pair of a source L2 ID/destination L2 ID may be interpreted as follows.

For example, an SL DRX configuration may be DRX configuration information applied by a receiving UE receiving SL data. Thus, from the perspective of the receiving UE, the source L2 ID may be the destination L2 ID of the transmitting UE and the destination L2 ID may be the source L2 ID of the transmitting UE. That is, for example, from the perspective of the receiving UE, an SL DRX configuration may be configured and may be used per source L2 ID/destination L2 ID pair. In addition, for example, a transmitting UE may also perform the role of a receiving UE that receives SL data transmitted by other UEs, like a receiving UE. That is, while the transmitting UE performs the role of a receiving UE, an SL DRX configuration may be configured and used per source L2 ID/destination L2 ID pair. That is, for a pair of a source L2 ID/destination L2 ID, an SL DRX configuration may be configured and used based on the direction of reception/transmission of the SL data (direction from a transmitting UE to a receiving UE, direction from a receiving UE to a transmitting UE).

For example, (method 8) (in the case of unicast) a common SL DRX configuration or a UE service specific SL DRX configuration may be configured per (or, in combination of) a pair of source/destination (source (L2 or L1 ID)/destination (L2 or L1 ID)) per service (or, PQI, or, PSID).

For example, since a pair of a source L2 ID/destination L2 ID may be used as an identifier to distinguish between PC5 unicast links, a UE service specific SL DRX configuration may be configured per PC5 unicast link or PC5 RRC connection (pair of source L2 ID/destination L2 ID), here, a UE service specific SL DRX configuration that reflects the PQI of the SL data exchanged between UEs on the PC5 unicast link or PC5 RRC connection (source L2 ID/destination L2 ID pair) may be configured.

Also, for example, a pair of a source L2 ID/destination L2 ID may be interpreted as follows.

For example, an SL DRX configuration may be DRX configuration information applied by a receiving UE receiving SL data. Thus, from a receiving UE perspective, a source L2 ID may be a destination L2 ID of a transmitting UE and the destination L2 ID may be the source L2 ID of the transmitting UE. that is, for example, an SL DRX configuration may be configured and used per source L2 ID/destination L2 ID pair from a receiving UE perspective. Also, for example, a transmitting UE may perform the role of a receiving UE that receives SL data transmitted by other UEs, like a receiving UE. That is, while the transmitting UE performs the role of a receiving UE, an SL DRX configuration may be configured and used per pair of a source L2 ID/destination L2 ID. That is, for a pair of a source L2 ID/destination L2 ID, an SL DRX configuration may be configured and used according to the direction of reception/transmission of the SL data (from a transmitting UE to a receiving UE, from a receiving UE to a transmitting UE).

Or, for example, (method 9) a common SL DRX configuration or UE service specific SL DRX configuration may be configured as a combination of any two or more of the following: service (PQI, or, PSID), a pair of source/destination (source (L2 or L1 ID)/destination (L2 or L1 ID)), destination L1 or L2 1D, source L1 or L2 ID, cast type (unicast or groupcast or broadcast), and PDB.

A default/common SL DRX configuration proposed in this disclosure may be an SL DRX configuration defined for the purpose of monitoring messages/data that are not service-related and messages/data where a QoS profile is not present (e.g., a PC5-S message: PC5-S direct communication request (DCR), PC5-S direct communication accept (DCA), etc.).

Figure 9:
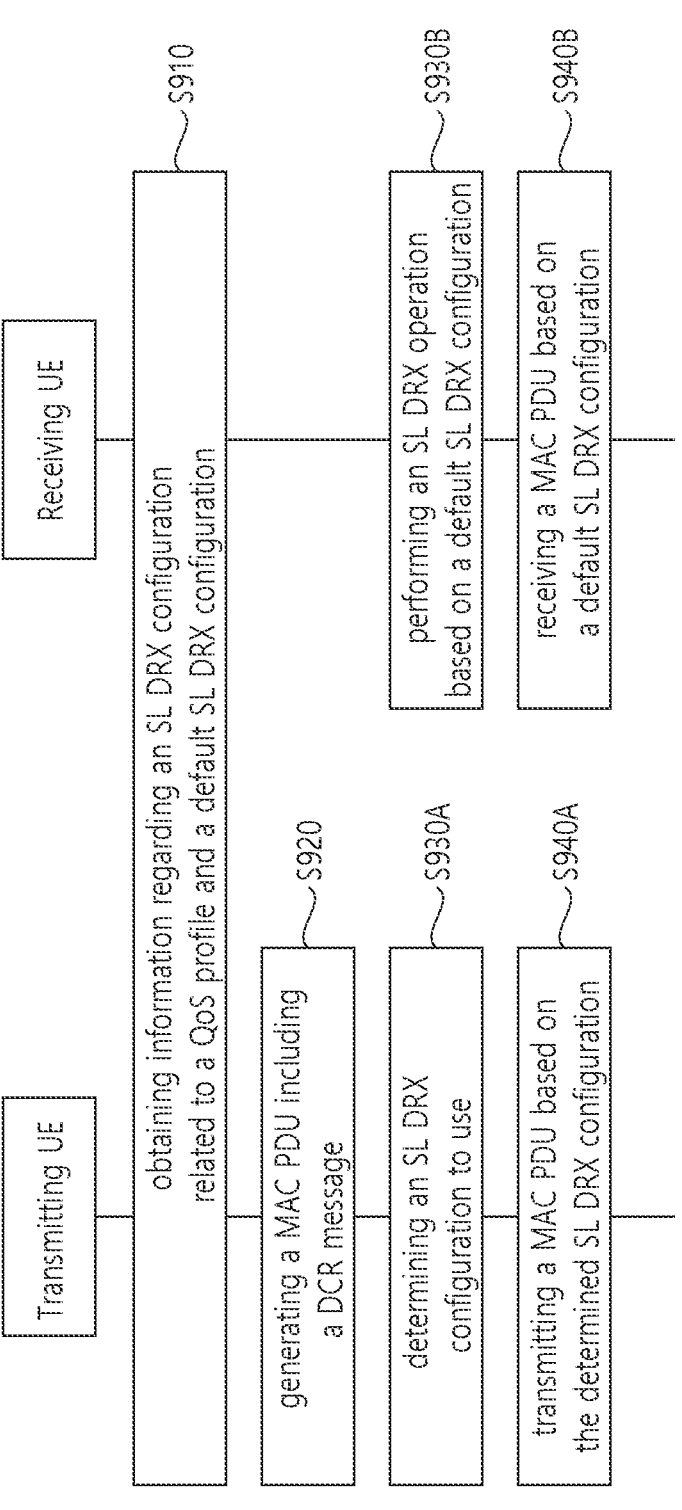
FIG. 9 shows a procedure for power-saving UEs to perform wireless communication based on a default SL DRX configuration, according to one embodiment of the present disclosure.

FIG. 9 shows a procedure for power-saving UEs to perform wireless communication based on a default SL DRX configuration, according to one embodiment of the present disclosure. The embodiment of FIG. 9 may be combined with various embodiments of the present disclosure.

Referring to FIG. 9, in step S910, a transmitting UE and a receiving UE may obtain information regarding at least one SL DRX configuration related to at least one QoS profile and a default SL DRX configuration. For example, the at least one SL DRX configuration may have a mapped relationship with the at least one QoS profile. For example, the default SL DRX configuration may be an SL DRX configuration that may be used by a UE for an SL DRX operation in various cases described in this disclosure.

In step S920, the transmitting UE may generate a MAC PDU including a DCR message. For example, there may be no QoS profile present for the DCR message. For example, the DCR message may be a message that is not related to any service.

In step S930A, the transmitting UE may determine, among the at least one SL DRX configuration and the default SL DRX configuration, which SL DRX configuration to use for an SL DRX operation. For example, the transmitting UE may determine to use the default SL DRX configuration based on the MAC PDU to be transmitted including the DCR message. Alternatively, for example, the transmitting UE may determine to use the default SL DRX configuration based on a QoS profile related to the MAC PDU to be transmitted not being present. Alternatively, for example, the transmitting UE may determine to use the default SL DRX configuration based on the MAC PDU to be transmitted not being related to any service. In step S930B, the receiving UE may determine to perform an SL DRX operation based on the default SL DRX configuration.

In step S940A, the transmitting UE may transmit a MAC PDU based on the determined SL DRX configuration. For example, the transmitting UE may transmit the MAC PDU based on the SL DRX configuration, based on the determination in step S930A to use the default SL DRX configuration. In step S940B, the receiving UE may receive the MAC PDU based on the default SL DRX configuration.

Power saving operation of a UE was not supported in NR V2X in Release 16, and power saving operation of a UE (e.g., power saving UE) will be supported in Release 17 NR V2X.

In this disclosure, a method for a UE to select an SL DRX timer value based on SCI information in sidelink groupcast and broadcast is proposed. In the following description, "when, if, in case of" may be replaced by "based on". Proposal 1. A Method for Selecting a Timer Value According to one embodiment of the present disclosure, if there are multiple PQI-based timer values (e.g., on-duration timer values/inactivity timer values/retransmission timer values), a receiving UE may select one timer value to use based on the SL priority included in SCI. Further, when a transmitting UE has multiple flows for the same groupcast/broadcast (same L2 destination ID for the groupcast/broadcast) as the receiving UE, the transmitting UE may receive each SCI related to a TB upon transmission of the TB for each flow. In addition, there may be multiple PQIs for the same groupcast/broadcast (same L2 destination ID for the groupcast/broadcast), and there may be an SL DRX configuration mapped per each PQI. In the proposal below, an operation where a receiving UE, upon receiving SCIs linked to TBs for multiple flows transmitted by a transmitting UE, selects the values of SL DRX timers (e.g., SL DRX on-duration timer/inactivity timer/retransmission timer/HARQ RTT timer) that it will use based on the information included in the SCIs is proposed.

For example, a receiving UE may identify a PQI that is mapped per SL priority by backtracking the PQI based on the SL priority included in the SCI. Alternatively, for example, by checking the groupcast or broadcast L1 destination ID and the remaining destination ID in the MAC subheader included in the SCI, the receiving UE may be aware of a single or multiple PQIs mapped to a groupcast or broadcast L2 destination ID, and the mapped SL DRX configuration per PQI. For example, if the PQI value mapped to the SL priority included in each SCI is and independent value, a receiving UE may choose the one with the highest SL priority and use the timer value of the SL DRX configuration mapped to the PQI related to that SL priority. Alternatively, a receiving UE may select the PQI with the lowest (or highest) PQI index and select the timer value of the SL DRX configuration related to that PQI Alternatively, for example, a receiving UE may verify the PQI that is mapped per SL priority by backtracking the PQI based on the SL priority included in the SCI. Alternatively, for example, by checking the groupcast or broadcast L1 destination ID included in the SCI and the remaining destination ID in the MAC subheader, a receiving UE may be aware of a single or multiple PQIs mapped to a groupcast or broadcast L2 destination ID, and the SL DRX configuration mapped per PQI. For example, if the PQI value mapped to the SL priority included in each SCI is not an independent value and the different PQI values are found together for one SL priority (e.g., PQI 1 is related to SL priority 1, PQI 2 is related to SL priority 2, and PQI 1 is related to SL priority 3), a UE may select and use the longest timer value of the configuration mapped to the overlapped PQI with the highest SL priority. Alternatively, a UE may select and use the timer value of the SL DRX configuration linked to the PQI with the highest SL priority. Alternatively, for example, a UE may select the PQI with the lowest (or highest) PQI index and select the timer value of the SL DRX configuration linked to the PQI. Alternatively, for example, a UE may select the highest SL priority and select the timer value of the SL DRX configuration linked to the priority.

Alternatively, for example, a UE may select the longest (or shortest) timer value of an SL DRX configuration mapped to the PQI.

According to one embodiment of the present disclosure, a receiving UE may receive SCI, but without using SL priority, and may select one of multiple PQIs mapped to a corresponding groupcast or broadcast L2 destination ID. For example, a receiving UE may select one with the highest priority among the mapped PQIs, independent of the received SCI. Here, a receiving UE may select and use the SL DRX timer value of the SL DRX configuration that is mapped to the selected PQI. This scheme may be interpreted to mean that a receiving UE may select an SL DRX configuration (e.g., SL DRX timer value) of a PQI mapped to a different SL priority value (e.g., priority "b") than the SL priority (e.g., priority "a") value indicated in received SCI.

According to one embodiment of the present disclosure, a method of delivering SCI including an index value mapped to a PQI value is proposed. For example, if there are multiple timer values based on PQI (e.g., values for an on-duration timer/values for an inactive timer/values for a retransmission timer), a receiving UE may select one timer value for its use based on the PQI index included in SCI.

For example, a receiving UE may select, from among the SL priorities mapped to the respective PQI indexes included in each received SCI, a timer value for the configuration mapped to the PQI with the highest (or lowest) priority.

For example, if a duplicate SL priority is found among the SL priorities mapped to each of the PQI indexes included in each of the received SCIs, a receiving UE may select and use the longest value of the timer values of the mapped configurations per duplicate PQI that has the highest priority among them.

For example, if the PQI index values included in each SCI are not independent values and the same PQI value is found together (e.g., PQI 1, PQI 2, PQI 1), a UE may select a timer value for an SL DRX configuration mapped to the PQI with the highest (or lowest) SL priority. Alternatively, for example, a UE may select the timer value of the SL DRX configuration mapped to the PQI with the highest (or lowest) SL priority, for PQIs with the same PQI index. Alternatively, for example, a UE may select and use a longer (or shorter) timer value for PQIs with the same PQI index, if the SL priority is also the same.

Alternatively, for example, a receiving UE may select and use the longest (or shortest) timer value among a plurality of SL DRX configurations mapped to a plurality of PQIs.

According to one embodiment of the present disclosure, the following operation is also proposed as an alternative method of selecting an SL DRX timer (e.g., on-duration timer/inactive timer/retransmission timer) value.

For example, when a UE has each SL DRX timer mapped to a plurality of PQIs by the previously proposed operation, the UE may operate the SL DRX timer by selecting the values of all SL DRX timers mapped to the individual PQIs.

According to one embodiment of the present disclosure, the following operation is also proposed.

For example, upon successful decoding of sidelink data by a receiving UE, the receiving UE may derive the logical channel ID of the MAC PDU that was successfully decoded. For example, this may be due to the inclusion of the logical channel ID in the MAC subheader. Further, a UE may use the obtained logical channel ID to track the QoS profile (e.g., PQI or PFI) that is mapped to the logical channel. If a successfully decoded MAC PDU is only multiplexed with SDUs corresponding to the same LC ID, a UE may select a value for an SL DRX timer that is mapped to the PQI (e.g., QoS profile) derived based on the LC ID to operate the SL DRX timer.

Alternatively, for example, if a MAC PDU that has been successfully decoded is multiplexed with SDUs corresponding to a plurality of LC IDs, a UE may select all values of the SL DRX timer that are mapped to a plurality of PQIs (e.g., QoS profiles) derived based on the LC IDs and apply them to the SL DRX timer operation. Alternatively, for example, if a MAC PDU that successfully decodes is multiplexed with SDUs corresponding to a plurality of LC IDs, a UE may select the longest value among the values of the SL DRX timers that are mapped to the plurality of PQIs (e.g., QoS profiles) derived based on the LC IDs to operate the SL DRX timers.

According to one embodiment of the present disclosure, the following operation is also proposed.

For example, upon successful decoding of sidelink data by a receiving UE, the receiving UE may derive the 24-bits destination ID of the MAC PDU that was successfully decoded. Further, for example, the UE may track the QoS profile (e.g., PQI or PFI) mapped to the obtained groupcast/broadcast 24-bits destination ID. For example, this may be because the groupcast/broadcast 24-bits L2 destination ID is generated based on a service ID, and thus it is possible to derive a QoS profile (PQI) that is mapped to the groupcast/broadcast service from the groupcast/broadcast 24-bits L2 destination ID. For example, a UE may operate an SL DRX timer by selecting an SL DRX timer value that is mapped to the derived QoS profile (PQI).

According to one embodiment of the present disclosure, a receiving UE may derive a linked QoS profile of the sidelink radio related to a logical channel ID (logical channel group ID) mapped to HARQ feedback enabled or disabled, according to a HARQ feedback mode (HARQ feedback enabled mode, or HARQ feedback disabled mode) indicated through SCI. And, for example, a method to enable a UE to use an SL DRX inactivity timer (or, SL DRX on-duration timer, or, SL DRX retransmission timer) that is mapped to the derived QoS profile is proposed.

2. Cycle Selection Method

According to one embodiment of the present disclosure, when a plurality of DRX cycle values based on PQI are present, a receiving UE may select one cycle value to use, based on the SL priority included in SCI. For example, w % ben a transmitting UE has a plurality of flows for the same groupcast/broadcast (same L2 destination ID for the groupcast/broadcast)(to a receiving UE), when transmitting a TB for each flow, a receiving UE may receive the SCI linked to each of the TBs. Furthermore, for example, there may be a plurality of PQIs for the same groupcast/broadcast (same L2 destination ID for the groupcast/broadcast), and there may be SL DRX configurations mapped for each PQI. The operation proposed below is an operation of a receiving UE to select the value of an SL DRX cycle to be used by it based on information included in SCI when it receives the SCI linked to a TB for a plurality of flows transmitted by a transmitting UE.

For example, if the PQI mapped per SL priority is an individual PQI value after backtracking PQI based on the SL priority included in the received SCI, a receiving UE may select and use the SL DRX cycle of the SL DRX configuration mapped to the PQI with the shortest (or longest) PDB. For example, the backtracking operation may be an operation of a receiving UE checking the groupcast or broadcast L1 destination ID included in SCI and the remaining destination ID in a MAC subheader, and checking the single or a plurality of PQIs mapped to the groupcast or broadcast L2 destination ID, and the SL DRX configuration mapped for each of the PQIs. If, for example, PQIs with the same PQI value are found, a UE may select and use an SL DRX cycle of an SL DRX configuration mapped to the PQI with the shortest (or longest) PDB.

Alternatively, for example, if the PQI mapped per SL priority is an individual PQI value after backtracking PQI based on the SL priority included in the received SCI, a receiving UE may select and use the SL DRX cycle of the SL DRX configuration mapped to the PQI with the highest (or lowest) priority. For example, the backtracking operation may be an operation of a receiving UE checking the groupcast or broadcast L1 destination ID included in SCI and the remaining destination ID in a MAC subheader, and checking the single or a plurality of PQIs mapped to the groupcast or broadcast L2 destination ID, and the SL DRX configuration mapped for each of the PQIs.

Alternatively, for example, if there are duplicate PQIs after backtracking PQIs based on the SL priority included in the received SCI, a receiving UE may select and use the SL DRX cycle of the SL DRX configuration mapped per PQI with the highest (or lowest) priority. For example, the backtracking operation may be an operation of a receiving UE checking the groupcast or broadcast L1 destination ID included in SCI and the remaining destination ID in a MAC subheader, and checking the single or a plurality of PQIs mapped to the groupcast or broadcast L2 destination ID, and an SL DRX configuration mapped to each of the PQIs. Alternatively, for example, if there are duplicate PQIs mapped per SL priority, a receiving UE may select the SL DRX cycle of an SL DRX configuration mapped to the PQI with the shortest (or longest) PDB (or select the one with the shortest SL DRX cycle value) and use it.

According to one embodiment of the present disclosure, a method for delivering SCI including an index value that is mapped to a PQI value is proposed. For example, if there are a plurality of DRX cycles based on PQI, a receiving UE may select one DRX cycle value to use based on the PQI index included in SCI.

For example, a receiving UE may select and use the SL DRX cycle of the SL DRX configuration that is mapped to the shortest (or longest) PDB among the PDBs mapped to each PQI index included in each SCI received.

Alternatively, for example, a receiving UE may select and use the shortest (or longest) DRX cycle of the SL DRX configuration that is mapped to each PQI index included in each SCI received.

Alternatively, for example, a receiving UE may select and use the SL DRX cycle of an SL DRX configuration mapped to the PQI with the highest (or, longest) priority among the SL priorities mapped to the respective PQI indexes included in each received SCI.

The process of selecting an SL DRX cycle value by a receiving UE, as proposed in this disclosure, may be expanded to be operated based on information included in an RRC message (Uu RRC message transmitted by a base station to the UE) after receiving the RRC message, or based on pre-configured information, rather than based on information received from SCI. For example, the information included in the RRC message may be delivered including PQI index information mapped to a groupcast or broadcast L2 destination ID, may be delivered including SL priority information mapped to a groupcast or broadcast L2 destination ID, and may also be delivered including SL DRX configuration information mapped per PQI. To this end, a UE performing SL groupcast/broadcast communication may deliver to the base station the groupcast or broadcast L2 destination ID, the PQI for the groupcast/broadcast flow, and the SL priority information for the groupcast/broadcast service (or, groupcast, or, broadcast L2 destination ID, SL DRX configuration/PQI for the groupcast/broadcast flow).

According to one embodiment of the present disclosure, the following operation is also proposed as an alternative method of selecting the value of the SL DRX cycle.

For example, by the previously proposed operation, a UE may perform an SL DRX operation by selecting/applying the values of all SL DRX cycles mapped to an individual PQI, when the values of each SL DRX cycle mapped to a plurality of PQIs are present. That is, for example, a UE may perform an active time operation (an operation of monitoring PSCCH/PSSCH, or an operation of transmitting PSCCH/PSSCH, active mode operation)/inactive time operation (an operation of not monitoring PSCCH/PSSCH, or an operation of not transmitting PSCCH/PSSCH, sleep mode operation) in every SL DRX cycle.

According to one embodiment of the present disclosure, the following operation is also proposed.

For example, when a receiving UE has successfully decoded sidelink data, the receiving UE may derive the logical channel ID of a MAC PDU that was successfully decoded. For example, this may be because the logical channel ID is included in a MAC subheader. Further, for example, a UE may track the QoS profile (e.g., PQI or PFI) that is mapped to the logical channel through the obtained logical channel ID. For example, if a successfully decoded MAC PDU is only multiplexed with SDUs corresponding to the same LC ID, a UE may operate an SL DRX timer by selecting a value for an SL DRX cycle that is mapped to a PQI (e.g., QoS profile) derived based on the LC ID. If a successfully decoded MAC PDU is multiplexed with SDUs corresponding to a plurality of LC IDs, a UE may select all values of SL DRX cycles that are mapped to the plurality of PQIs (e.g., QoS profiles) derived based on the LC IDs and apply them for an SL DRX operation. That is, for example, a UE may perform an active time operation (an operation of monitoring PSCCH/PSSCH, or an operation of transmitting PSCCH/PSSCH, active mode operation)/inactive time operation (an operation of not monitoring PSCCH/PSSCH, or an operation of not transmitting PSCCH/PSSCH, sleep mode operation) in every SL DRX cycle. Alternatively, for example, if a successfully decoded MAC PDU is multiplexed with SDUs corresponding to a plurality of LC IDs, a UE may operate an SL DRX by selecting the longest value among the values of the SL DRX cycles that are mapped to the plurality of PQIs (e.g., QoS profiles) derived based on the LC IDs.

According to one embodiment of the present disclosure, the following operation is also proposed.

For example, if a receiving UE successfully decodes sidelink data, the receiving UE may derive a 24-bits destination ID of a MAC PDU that was successfully decoded. Further, for example, a UE may track the QoS profile (e.g., PQI or PFI) that is mapped to the obtained groupcast/broadcast 24-bits destination ID. For example, this may be because the groupcast/broadcast 24-bit L2 destination ID is generated based on a service ID, and thus it is possible to derive a QoS profile (PQI) that is mapped to a groupcast/broadcast service from the groupcast/broadcast 24-bit L2 destination ID. For example, a UE may operate an SL DRX by selecting a value for an SL DRX cycle that is mapped to the derived QoS profile (PQI).

According to one embodiment of the present disclosure, a method for a receiving UE to select a value of an SL DRX timer and a value of an SL DRX cycle based on the information below is proposed.

i) a 24-bits L2 destination ID for groupcast/broadcast
    ii) a 16-bits L1 destination ID in SCI, for groupcast/broadcast
    iii) an 8-bits remaining destination ID for a groupcast/broadcast, in a MAC subheader
    iv) PQI
    v) an SL priority
    vi) an SL DRX configuration which is mapped with PQI According to one embodiment of the present disclosure, when there are a plurality of SL DRX cycles that are mapped to a plurality of QoS profiles linked to the same L2 destination ID, a receiving UE may select one SL DRX cycle and apply it to an SL DRX operation. In this case, for example, a method for a receiving UE to derive a minimum common multiple of the values of a plurality of SL DRX cycles and apply the derived minimum common multiple as an SL DRX cycle is proposed in this disclosure.

For example, a plurality of cycles may have a mutual inclusion (or subset) relationship, or a relationship in which the shortest cycle of the plurality of cycles (and/or a cycle based on a minimum common multiple derived based on the plurality of cycles) includes the longest cycle (or all remaining cycles), and/or a relationship in which the shortest cycle of the plurality of cycles (and/or a cycle based on a minimum common multiple derived based on the plurality of cycles) includes the longest cycle (or all remaining cycles) as a subset. Here, for example, the plurality of cycles may be interpreted as a plurality of QOS profile-related cycles linked to a one (L2 or L1) destination ID (and/or source ID).

For example, the proposed solution of this disclosure is expandable for HARQ feedback enabled transmissions and HARQ feedback disabled transmissions as shown below.

That is, for example, a method for a receiving UE to extend a timer value by a HARQ RTT time from a selected timer value, when the value of SL DRX timer is selected by the receiving UE through the method proposed in this disclosure, and the receiving UE has confirmed a HARQ feedback enabled transmission through SCI is proposed.

In the present disclosure, a method is proposed from the perspective of the operation of a receiving UE. In order to synchronize the procedure for selecting a value of an SL DRX timer and a value of an SL DRX cycle to be used by a receiving UE, proposed in this disclosure, with the procedure for selecting a value of an SL DRX timer and a value of an SL DRX cycle that are used by the receiving UE (SL DRX operation synchronization), it is proposed that a transmitting UE performs the same procedure (based on information included in the transmitted SCI: SL priority, PQI index, or PQI information mapped to an L2 destination ID included in the transmitted SCI).

The SL DRX configuration referred to in this disclosure may include at least one or more of the following parameters.

which the counterpart UE transmits, until the expiration of an SL DRX HARQ RTT timer.

SL DRX retransmission timer: may indicate an interval of time during which a UE performing SL DRX operation is active time to receive retransmission packets (or PSSCH assignments) transmitted by other UE. For example, when an SL DRX HARQ RTT timer expires, an SL DRX retransmission timer may start. During this timer period, a UE may monitor a reception of retransmission sidelink packets (or PSSCH allocations) transmitted by other UE.

In addition, in the following description, the names of the timers (SL DRX On-Duration Timer, SL DRX Inactivity timer, SL HARQ RTT Timer, SL DRX Retransmission Timer, etc.) are exemplary, and timers that perform the same/similar functions based on what is described in each timer can be considered the same/similar timer regardless of the name.

The proposal in this disclosure is a solution that may also be applied and extended to address the problem of loss due to interruption in Uu bandwidth part (BWP) switching.

Furthermore, the proposal of the present disclosure is a solution that may also be applied and extended to address the problem of loss due to interruption caused by SL BWP switching, for example, when a UE supports SL multiple BWP.

TABLE 13

| Sidelink DRX configurations |
| --- |
| ✓ SL drx-onDurationTimer: the duration at the beginning of a SL DRX Cycle; |
| ✓ SL drx-SlotOffset: the delay before starting the sl drx-onDurationTimer; |
| ✓ SL drx-InactivityTimer: the duration after the PSCCH occasion in which a PSCCH indicates a new SL transmission for the MAC entity; |
| ✓ SL drx-StartOffset: the subframe where the SL DRX cycle start; |
| ✓ SL drx-Cycle: the SL DRX cycle; |
| ✓ SL drx-HARQ-RTT-Timer (per HARQ process or per sidelink process): the minimum duration before an assignment for HARQ retransmission is expected by the MAC entity. |
| ✓ SL drx-RetransmissionTimer (per HARQ process or per sidelink process): the maximum duration until a retransmission is received. |

The following SL DRX timers mentioned in this disclosure may be used for the following purposes.

SL DRX on-duration timer: Indicates the period of time during which a UE performing SL DRX operation should operate as the default active time to receive PSCCH/PSSCH from other UE.

SL DRX inactivity timer: may represent an interval that extends an SL DRX on-duration interval, which is an interval during which a UE performing SL DRX operation must operate as active time by default to receive PSCCH/PSSCH from other UE. That is, an SL DRX on-duration timer may be extended by the SL DRX inactivity timer interval. Furthermore, when a UE receives a PSCCH for a new TB (first SCI and/or second SCI) or a new packet (new PSSCH transmission) from other UE, the UE may extend the SL DRX on-duration timer by starting an SL DRX inactivity timer.

SL DRX HARQ RTT timer: may indicate an interval during which a UE performing SL DRX operation may operate in sleep mode until it receives a retransmission packet (or PSSCH assignment) from other UE. That is, if a UE starts the SL DRX HARQ RTT timer, the UE may determine that other UE will not transmit a sidelink retransmission packet to it until the SL DRX HARQ RTT timer expires and may operate in sleep mode during that timer. Or, the UE may not perform monitoring of an SL channel/signal The proposals in this disclosure may be extended to parameters (and timers) included in default/common SL DRX configurations or default/common SL DRX patterns or default/common SL DRX configurations, as well as parameters (and timers) included in UE pair specific SL DRX configurations or UE pair specific SL DRX patterns or UE pair specific SL DRX configurations.

Furthermore, for example, an on-duration term referred to in the present disclosure may be extended to an active time interval, and an off-duration term may be extended to a sleep time interval. For example, an active time may refer to a period of time when a UE is operating in a wake up state (RF module is on) to receive/transmit radio signals. For example, sleep time may refer to an interval during which a UE operates in a sleep mode state (RF module is of) to conserve power. For example, a sleep period does not imply that a transmitting UE is obligated to operate in sleep mode, i.e., the UE may be allowed to operate in active time for a short period of time to perform a sensing operation/transmission operation if necessary, even during a sleep period.

Further, for example, whether (some of) the proposed schemes/rules of this disclosure apply and/or the related parameters (e.g., thresholds) may be configured specifically (or differently or independently) depending on the resource pool, congestion level, service priority (and/or type), QoS requirements (e.g., latency, reliability) or PQI, traffic type (e.g., (aperiodic) generation), SL transport resource allocation mode (Mode 1, Mode 2), etc.

For example, whether to apply the proposals of the present disclosure (and/or related parameter configuration value) may be configured specifically (and/or, independently and/or differently) for at least one of a resource pool (e.g., a resource pool where a PSFCH is configured, a resource pool where a PSFCH is not configured), service/packet type (and/or priority), QoS profile or QoS requirement (e.g., URLLC/EMBB traffic, reliability, latency), PQI. PFI, cast type (e.g., unicast, groupcast, broadcast), (resource pool) congestion level (e.g., CBR), SL HARQ feedback mode (e.g., NACK only feedback. ACK/NACK feedback), a HARQ feedback enabled MAC PDU (and/or a HARQ feedback disabled MAC PDU) transmission case, whether PUCCH based SL HARQ feedback reporting operation is configured, a case where pre-emption (and/or re-evaluation) (or, -based resource reselection) is (not) performed, (L2 or L1) (source and/or destination) ID, (L2 or L1)(a combination of a source layer ID and a destination layer ID) identifier, (L2 or L1) (a combination of a pair of a source layer ID and an destination layer ID, and a cast type) identifier, a direction of a pair of a source layer ID and a destination layer ID, PC5 RRC connection/link, a case where an SL DRX is (not) performed (or, supported), SL mode type (resource allocation mode 1, resource allocation mode 2), a case where (a) periodic resource reservation is performed, a Tx profile (e.g., a TX profile indicating that it is a service where an SL DRX operation is supported, a Tx profile indicating that it is a service where an SL DRX operation is not needed to be supported).

For example, the term specific time as used in the present disclosure may refer to a predefined amount of time for a UE to receive sidelink signaling or sidelink data from another UE, or a period of time, or a specific timer (SL DRX retransmission timer, SL DRX inactivity timer, or a timer to ensure a receiving UE to operate as an active time in DRX operation) time, during which a UE is active.

Further, for example, whether the proposals and proposed rules in this disclosure apply (and/or the associated parameter configuration values) may also apply to mmWave SL operation.

FIG. 10 shows a procedure for a first device to perform wireless communication, according to one embodiment of the present disclosure. The embodiment of FIG. 10 may be combined with various embodiments of the present disclosure.

Referring to FIG. 10, in step S1010, a first device may obtain information regarding a sidelink (SL) discontinuous reception (DRX) configuration related to at least one quality of service (QoS) profile and information regarding a default SL DRX configuration. In step S1020, the first device may generate a medium access control (MAC) protocol data unit (PDU) related to SL communication. In step S1030, the first device may determine an SL DRX configuration for the SL communication. For example, the default SL DRX configuration may be determined as the SL DRX configuration for the SL communication, based on an SL DRX configuration mapped to a QoS profile related to the MAC PDU not being present. In step S1040, the first device may transmit, to a second device, sidelink control information (SCI) for scheduling of a physical sidelink shared channel (PSSCH) through a physical sidelink control channel (PSCCH), based on an active time of the SL DRX configuration for the SL communication. In step S1050, the first device may transmit, to the second device, the MAC PDU through the PSSCH, based on the active time.

For example, the QoS profile related to the MAC PDU may be present.

For example, the QoS profile related to the MAC PDU may be not present.

For example, the default SL DRX configuration may be determined as the SL DRX configuration for the SL communication, based on the MAC PDU being related to data for a groupcast service or a broadcast service.

For example, the default SL DRX configuration may be determined as the SL DRX configuration for the SL communication, based on the MAC PDU being related to a control signal for a configuration of a unicast connection not related to data for a groupcast service or a broadcast service.

For example, he default SL DRX configuration may be determined as the SL DRX configuration for the SL communication, based on the MAC including a direct communication request (DCR) message.

For example, the default SL DRX configuration may be determined as the SL DRX configuration for the SL communication, based on the MAC PDU not being mapped to any QoS profile.

For example, the QoS profile related to the MAC PDU may be a first QoS profile mapped to the MAC PDU, and the first QoS profile may be not mapped to any SL DRX configuration.

For example, a parameter in the default SL DRX configuration may be randomized, and the randomizing of the parameter in the default SL DRX configuration may be performed based on a change of a zone ID where the first device is located.

For example, a parameter in the default SL DRX configuration may be randomized, and the randomizing of the parameter in the default SL DRX configuration may be performed based on a change in whether the first device is in coverage.

For example, a parameter in the default SL DRX configuration may be randomized, and the randomizing of the parameter in the default SL DRX configuration may be performed based on a change of a service ID of the first device.

For example, a parameter in the default SL DRX configuration may be randomized, and the randomizing of the parameter in the default SL DRX configuration may be performed based on remaining battery of the first device.

For example, a parameter in the default SL DRX configuration may be randomized, and the randomizing of the parameter in the default SL DRX configuration may be performed based on a change of a type or a direction of the SL communication.

The above-described embodiments may be applied to various devices described below. First, a processor 102 of a first device 100 may obtain information regarding a sidelink (SL) discontinuous reception (DRX) configuration related to at least one quality of service (QoS) profile and information regarding a default SL DRX configuration. And, the processor 102 of the first device 100 may generate a medium access control (MAC) protocol data unit (PDU) related to SL communication. And, the processor 102 of the first device 100 may determine an SL DRX configuration for the SL communication. For example, the default SL DRX configuration may be determined as the SL DRX configuration for the SL communication, based on an SL DRX configuration mapped to a QoS profile related to the MAC PDU not being present. And, the processor 102 of the first device 100 may control a transceiver 106 to transmit, to a second device 200, sidelink control information (SCI) for scheduling of a physical sidelink shared channel (PSSCH)

through a physical sidelink control channel (PSCCH), based on an active time of the SL DRX configuration for the SL communication. And, the first device may control the transceiver 106 to transmit, to the second device 200, the MAC PDU through the PSSCH, based on the active time.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain information regarding a sidelink (SL) discontinuous reception (DRX) configuration related to at least one quality of service (QoS) profile and information regarding a default SL DRX configuration; generate a medium access control (MAC) protocol data unit (PDU) related to SL communication; determine an SL DRX configuration for the SL communication, wherein the default SL DRX configuration may be determined as the SL DRX configuration for the SL communication, based on an SL DRX configuration mapped to a QoS profile related to the MAC PDU not being present; transmit, to a second device, sidelink control information (SCI) for scheduling of a physical sidelink shared channel (PSSCH) through a physical sidelink control channel (PSCCH), based on an active time of the SL DRX configuration for the SL communication; and transmit, to the second device, the MAC PDU through the PSSCH, based on the active time.

For example, the QoS profile related to the MAC PDU may be present.

For example, the QoS profile related to the MAC PDU may be not present.

For example, the default SL DRX configuration may be determined as the SL DRX configuration for the SL communication, based on the MAC PDU being related to data for a groupcast service or a broadcast service.

For example, the default SL DRX configuration may be determined as the SL DRX configuration for the SL communication, based on the MAC PDU being related to a control signal for a configuration of a unicast connection not related to data for a groupcast service or a broadcast service.

For example, he default SL DRX configuration may be determined as the SL DRX configuration for the SL communication, based on the MAC including a direct communication request (DCR) message.

For example, the default SL DRX configuration may be determined as the SL DRX configuration for the SL communication, based on the MAC PDU not being mapped to any QoS profile.

For example, the QoS profile related to the MAC PDU may be a first QoS profile mapped to the MAC PDU, and the first QoS profile may be not mapped to any SL DRX configuration.

For example, a parameter in the default SL DRX configuration may be randomized, and the randomizing of the parameter in the default SL DRX configuration may be performed based on a change of a zone ID where the first device is located.

For example, a parameter in the default SL DRX configuration may be randomized, and the randomizing of the parameter in the default SL DRX configuration may be performed based on a change in whether the first device is in coverage.

For example, a parameter in the default SL DRX configuration may be randomized, and the randomizing of the parameter in the default SL DRX configuration may be performed based on a change of a service ID of the first device.

For example, a parameter in the default SL DRX configuration may be randomized, and the randomizing of the parameter in the default SL DRX configuration may be performed based on remaining battery of the first device.

For example, a parameter in the default SL DRX configuration may be randomized, and the randomizing of the parameter in the default SL DRX configuration may be performed based on a change of a type or a direction of the SL communication.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain information regarding a sidelink (SL) discontinuous reception (DRX) configuration related to at least one quality of service (QoS) profile and information regarding a default SL DRX configuration; generate a medium access control (MAC) protocol data unit (PDU) related to SL communication; determine an SL DRX configuration for the SL communication, wherein the default SL DRX configuration may be determined as the SL DRX configuration for the SL communication, based on an SL DRX configuration mapped to a QoS profile related to the MAC PDU not being present; transmit, to a second UE, sidelink control information (SCI) for scheduling of a physical sidelink shared channel (PSSCH) through a physical sidelink control channel (PSCCH), based on an active time of the SL DRX configuration for the SL communication; and transmit, to the second UE, the MAC PDU through the PSSCH, based on the active time.

According to an embodiment of the present disclosure, a non-transitory computer-readable storage medium storing instructions may be proposed, that, when executed, cause a first device to: obtain information regarding a sidelink (SL) discontinuous reception (DRX) configuration related to at least one quality of service (QoS) profile and information regarding a default SL DRX configuration; generate a medium access control (MAC) protocol data unit (PDU) related to SL communication, determine an SL DRX configuration for the SL communication, wherein the default SL DRX configuration may be determined as the SL DRX configuration for the SL communication, based on an SL DRX configuration mapped to a QoS profile related to the MAC PDU not being present, transmit, to a second device, sidelink control information (SCI) for scheduling of a physical sidelink shared channel (PSSCH) through a physical sidelink control channel (PSCCH), based on an active time of the SL DRX configuration for the SL communication; and transmit, to the second device, the MAC PDU through the PSSCH, based on the active time.

FIG. 11 shows a procedure for a second device to perform wireless communication, according to one embodiment of the present disclosure. The embodiment of FIG. 11 may be combined with various embodiments of the present disclosure.

Referring to FIG. 11, in step S110, a second device may obtain information regarding a sidelink (SL) discontinuous reception (DRX) configuration related to at least one quality of service (QoS) profile and information regarding a default SL DRX configuration. In step S1120, the second device may receive, from a first device, sidelink control information (SCI) for scheduling of a physical sidelink shared channel (PSSCH) through a physical sidelink control channel (PSCCH), based on an active time of the default SL DRX configuration. In step S1130, the second device may receive, from the first device, a medium access control (MAC) protocol data unit (PDU) through the PSSCH, based on the active time. For example, the MAC PDU may be received based on the active time of the default SL DRX configuration, based on an SL DRX configuration mapped to a QoS profile related to the MAC PDU not being present.

For example, the QoS profile related to the MAC PDU may be a first QoS profile mapped to the MAC PDU, and the MAC PDU may be received based on the active time of the default SL DRX configuration, based on the first QoS profile not being mapped to any SL DRX configuration.

The above-described embodiments may be applied to various devices described below. First, a processor 202 of a second device 200 may obtain information regarding a sidelink (SL) discontinuous reception (DRX) configuration related to at least one quality of service (QoS) profile and information regarding a default SL DRX configuration. And, the processor 202 of the second device 200 may control a transceiver 206 to receive, from a first device 100, sidelink control information (SCI) for scheduling of a physical sidelink shared channel (PSSCH) through a physical sidelink control channel (PSCCH), based on an active time of the default SL DRX configuration. And, the processor 202 of the second device 200 may control the transceiver 206 to receive, from the first device 100, a medium access control (MAC) protocol data unit (PDU) through the PSSCH, based on the active time. For example, the MAC PDU may be received based on the active time of the default SL DRX configuration, based on an SL DRX configuration mapped to a QoS profile related to the MAC PDU not being present.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain information regarding a sidelink (SL) discontinuous reception (DRX) configuration related to at least one quality of service (QoS) profile and information regarding a default SL DRX configuration; receive, from a first device, sidelink control information (SCI) for scheduling of a physical sidelink shared channel (PSSCH) through a physical sidelink control channel (PSCCH), based on an active time of the default SL DRX configuration; and receive, from the first device, a medium access control (MAC) protocol data unit (PDU) through the PSSCH, based on the active time, wherein the MAC PDU may be received based on the active time of the default SL DRX configuration, based on an SL DRX configuration mapped to a QoS profile related to the MAC PDU not being present.

For example, the QoS profile related to the MAC PDU may be a first QoS profile mapped to the MAC PDU, and the MAC PDU may be received based on the active time of the default SL DRX configuration, based on the first QoS profile not being mapped to any SL DRX configuration.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
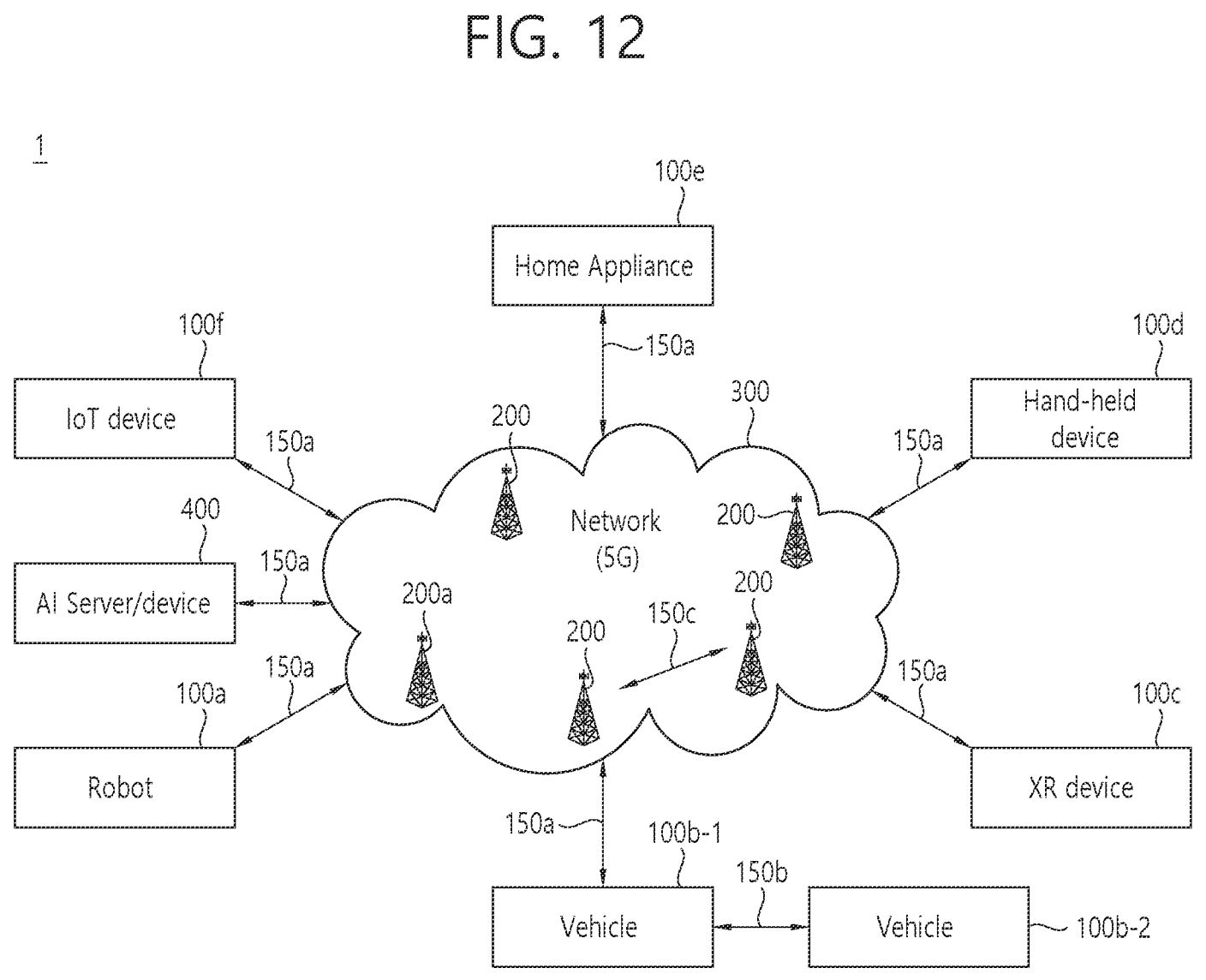

FIG. 12 shows a communication system 1, based on an embodiment of the present disclosure. The embodiment of FIG. 12 may be combined with various embodiments of the present disclosure.

Referring to FIG. 12, a communication system 1 to which various embodiments of the present disclosure are applied includes wireless devices, Base Stations (BSs), and a network. Herein, the wireless devices represent devices performing communication using Radio Access Technology (RAT)(e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR) Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, the wireless communication technologies implemented in the wireless devices 100a-100f of the present disclosure may include LTE, NR, and 6G, as well as Narrowband Internet of Things for low power communication. In this case, for example, NB-IoT technology may be an example of Low Power Wide Area Network (LPWAN) technology, and may be implemented in specifications such as LTE Cat NB1 and/or LTE Cat NB2, and is not limited to the above names. Additionally or alternatively, the wireless communication technology implemented in the wireless devices 100a-100f of this specification may perform communication based on LTE-M technology. In one example, LTE-M technology may be an example of LPWAN technology and may be referred to by various names, such as enhanced Machine Type Communication (eMTC). For example, LTE-M technology may be implemented as at least one of various specifications, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above names. Additionally or alternatively, the wireless communication technology implemented in the wireless devices 100a-100f of this disclosure may include at least one of ZigBee, Bluetooth, and Low Power Wide Area Network (LPWAN), with consideration for low power communication, and is not limited to the above names. For example, ZigBee technology can create personal area networks (PANs) for small, low-power digital communications based on various specifications, such as IEEE 802.15.4, and may be referred to by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*. 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
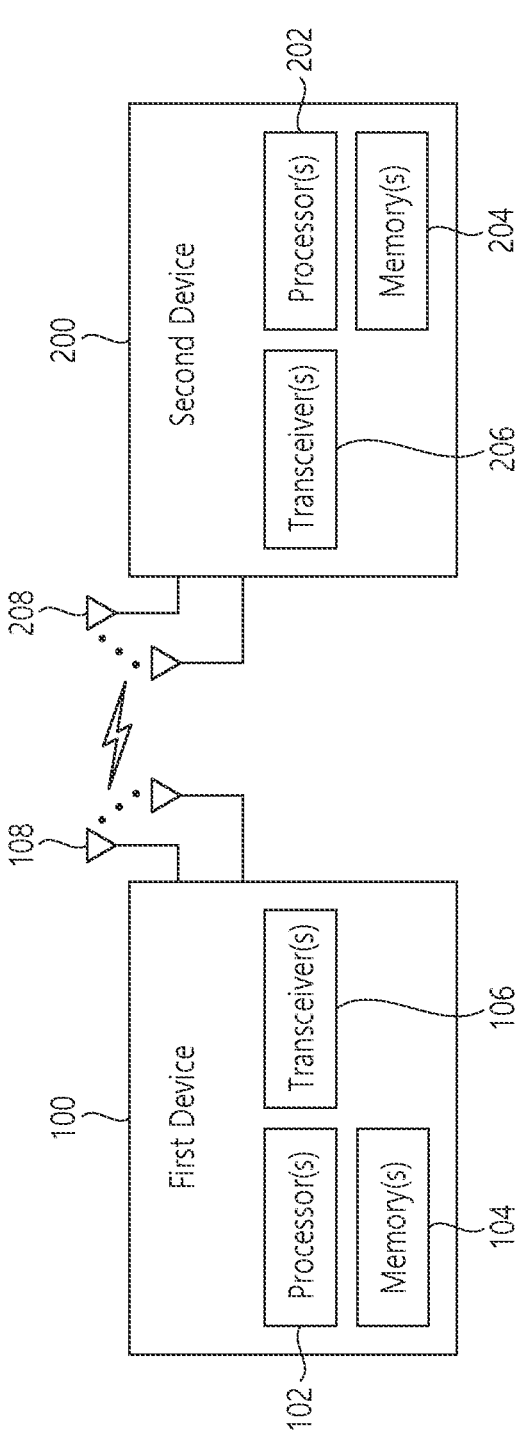
FIG. 13 shows wireless devices, based on an embodiment of the present disclosure.

FIG. 13 shows wireless devices, based on an embodiment of the present disclosure. The embodiment of FIG. 13 may be combined with various embodiments of the present disclosure.

Referring to FIG. 13, a first wireless device 100 and a second wireless device 200 may transmit radio signals through a variety of RATs (e.g., LTE and NR). Herein, (the first wireless device 100 and the second wireless device 200) may correspond to {the wireless device 100*x* and the BS 200} and/or {the wireless device 100*x* and the wireless device 100*x*} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs. SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
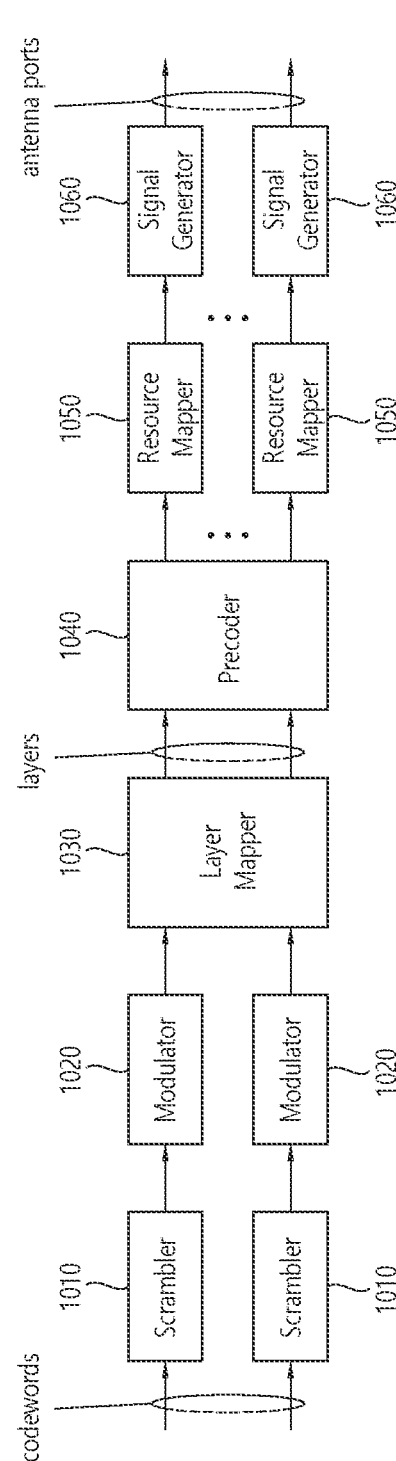
FIG. 14 shows a signal process circuit for a transmission signal, based on an embodiment of the present disclosure.

FIG. 14 shows a signal process circuit for a transmission signal, based on an embodiment of the present disclosure. The embodiment of FIG. 14 may be combined with various embodiments of the present disclosure.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 15:
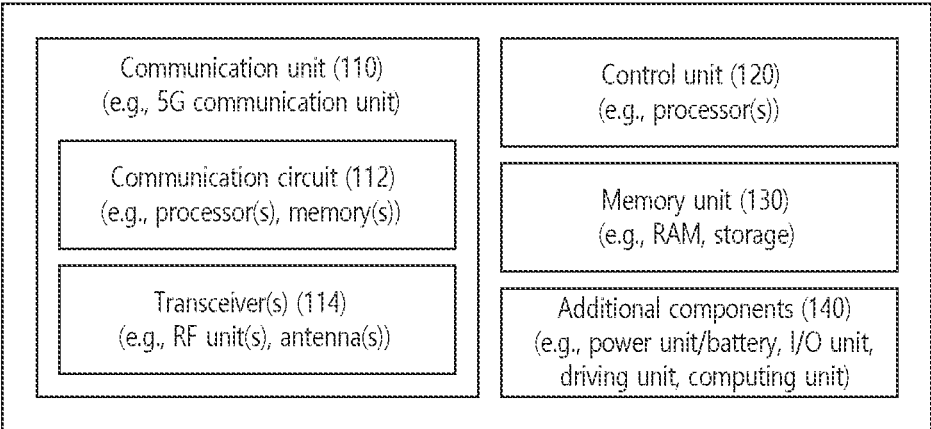
FIG. 15 shows another example of a wireless device, based on an embodiment of the present disclosure.

FIG. 15 shows another example of a wireless device, based on an embodiment of the present disclosure. The wireless device may be implemented in various forms according to a use-case/service (refer to FIG. 12). The embodiment of FIG. 15 may be combined with various embodiments of the present disclosure.

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 10 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Figure 16:
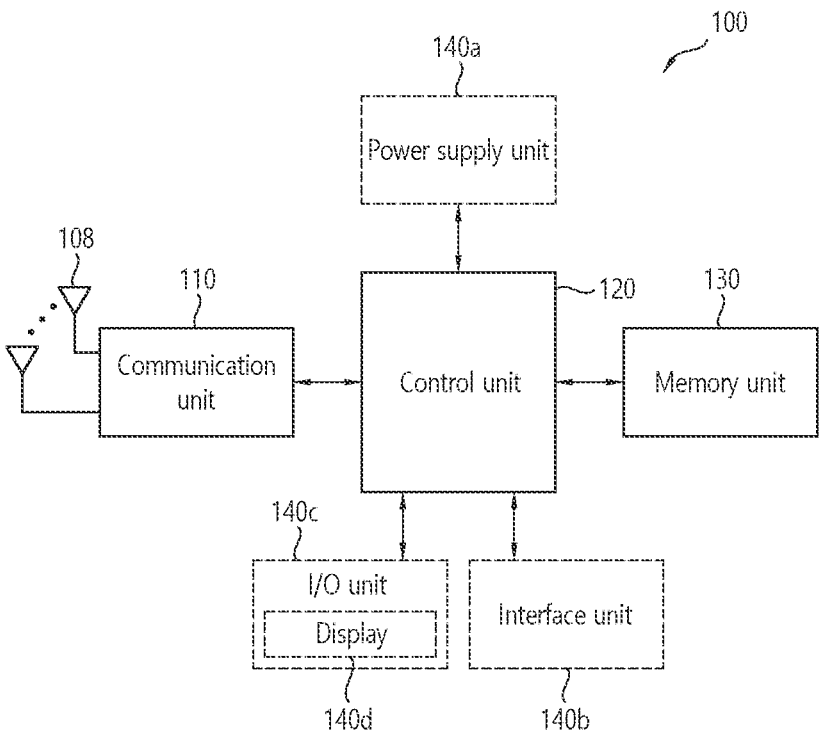
FIG. 16 shows a hand-held device, based on an embodiment of the present disclosure.

FIG. 16 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 16 may be combined with various embodiments of the present disclosure.

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 17:
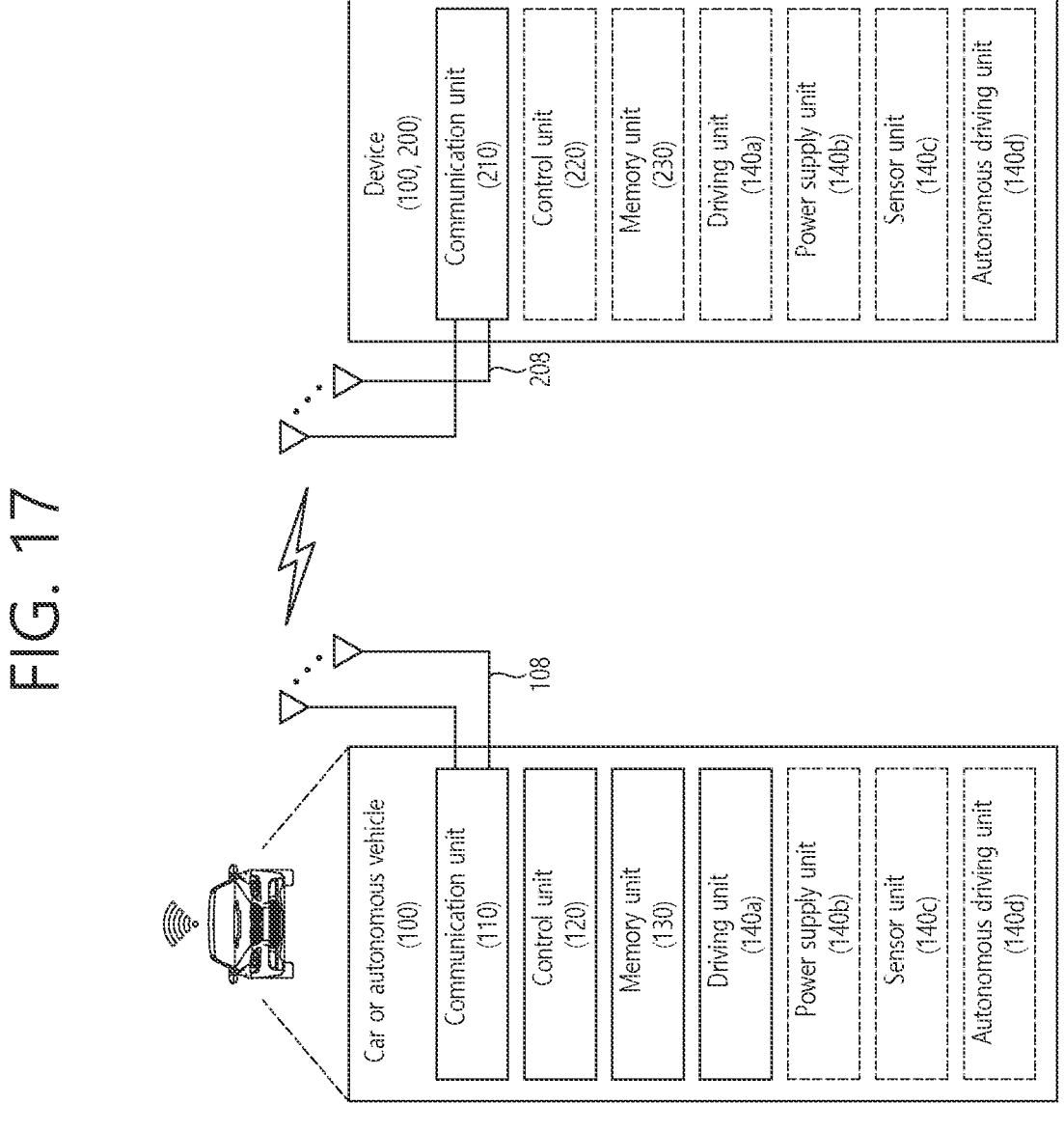
FIG. 17 shows a vehicle or an autonomous vehicle, based on an embodiment of the present disclosure.

FIG. 17 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 17 may be combined with various embodiments of the present disclosure.

Referring to FIG. 17, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:

obtaining information for at least one sidelink (SL) discontinuous reception (DRX) configuration for groupcast and broadcast communication mapped from at least one quality of service (QoS) profile and information for a default SL DRX configuration for groupcast and broadcast communication;

generating a medium access control (MAC) protocol data unit (PDU) related to SL communication;

transmitting, to a second device, sidelink control information (SCI) for scheduling of a physical sidelink shared channel (PSSCH) through a physical sidelink control channel (PSCCH), using the default SL DRX configuration for a QoS profile related to the MAC PDU, that is not mapped to the at least one SL DRX configuration; and transmitting, to the second device, the MAC PDU through the PSSCH, using the default SL DRX configuration for the QoS profile, that is not mapped to the at least one SL DRX configuration.

2. The method of claim 1, wherein the QoS profile is present.

3. The method of claim 1, wherein the QoS profile is not present.

4. The method of claim 1, wherein the default SL DRX configuration is used for the transmissions of the SCI and the MAC PDU, based on the MAC PDU being related to data for a groupcast service or a broadcast service.

5. The method of claim 1, wherein the default SL DRX configuration is used for the transmissions of the SCI and the MAC PDU, based on the MAC PDU being related to a control signal for a configuration of a unicast connection not related to data for a groupcast service or a broadcast service.

6. The method of claim 1, wherein the default SL DRX configuration is used for the transmissions of the SCI and the MAC PDU, based on the MAC PDU including a direct communication request (DCR) message.

7. The method of claim 1, wherein the default SL DRX configuration is used for the transmissions of the SCI and the MAC PDU, based on the MAC PDU not being mapped to any QoS profile.

8. The method of claim 1, wherein the QoS profile is a first QoS profile mapped to the MAC PDU, and wherein the first QoS profile is not mapped to the at least one SL DRX configuration.

9. The method of claim 1, wherein a parameter in the default SL DRX configuration is randomized, and wherein the randomizing of the parameter in the default SL DRX configuration is performed based on a change of a zone ID where the first device is located.

10. The method of claim 1, wherein a parameter in the default SL DRX configuration is randomized, and wherein the randomizing of the parameter in the default SL DRX configuration is performed based on a change in whether the first device is in coverage.

11. The method of claim 1, wherein a parameter in the default SL DRX configuration is randomized, and wherein the randomizing of the parameter in the default SL DRX configuration is performed based on a change of a service ID of the first device.

12. The method of claim 1, wherein a parameter in the default SL DRX configuration is randomized, and wherein the randomizing of the parameter in the default SL DRX configuration is performed based on remaining battery of the first device.

13. The method of claim 1, wherein a parameter in the default SL DRX configuration is randomized, and wherein the randomizing of the parameter in the default SL DRX configuration is performed based on a change of a type or a direction of the SL communication.

14. A first device for performing wireless communication, the first device comprising:

one or more memories storing instructions;

one or more transceivers; and one or more processors connected to the one or more memories and the one or more transceivers, wherein the one or more processors execute the instructions to:

obtain information for at least one sidelink (SL) discontinuous reception (DRX) configuration for groupcast and broadcast communication mapped from at least one quality of service (QoS) profile and information for a default SL DRX configuration for groupcast and broadcast communication;

generate a medium access control (MAC) protocol data unit (PDU) related to SL communication;

transmit, to a second device, sidelink control information (SCI) for scheduling of a physical sidelink shared channel (PSSCH) through a physical sidelink control channel (PSCCH), using the default SL DRX configuration for a QoS profile related to the MAC PDU, that is not mapped to the at least one SL DRX configuration; and transmit, to the second device, the MAC PDU through the PSSCH, using the default SL DRX configuration for the QoS profile, that is not mapped to the at least one SL DRX configuration.

15. A device adapted to control a first user equipment (UE), the device comprising:

one or more processors; and one or more memories operably connectable to the one or more processors and storing instructions, wherein the one or more processors execute the instructions to:

obtain information for at least one sidelink (SL) discontinuous reception (DRX) configuration for groupcast and broadcast communication mapped from at least one quality of service (QoS) profile and information for a default SL DRX configuration for groupcast and broadcast communication;

generate a medium access control (MAC) protocol data unit (PDU) related to SL communication;

transmit, to a second UE, sidelink control information (SCI) for scheduling of a physical sidelink shared channel (PSSCH) through a physical sidelink control channel (PSCCH), using the default SL DRX configuration for a QoS profile related to the MAC PDU, that is not mapped to the at least one SL DRX configuration; and transmit, to the second UE, the MAC PDU through the PSSCH, using the default SL DRX configuration for the QoS profile, that is not mapped to the at least one SL DRX configuration.

* * * * *